United States Patent [19]

Yoshida et al.

[11] Patent Number: 5,796,378

[45] Date of Patent: Aug. 18, 1998

[54] BIRIFRINGENCE CONTROL TYPE LIQUID CRYSTAL DISPLAY DEVICE AND APPARATUS AND METHOD OF DRIVING THE SAME

[75] Inventors: Tetsushi Yoshida, Kanagawa-ken; Soichi Sato, Fussa; Zenta Kikuchi, Hamura, all of Japan

[73] Assignee: Casio Computer Co., Ltd., Tokyo, Japan

[21] Appl. No.: 408,811

[22] Filed: Mar. 21, 1995

[30] Foreign Application Priority Data

| Mar. 29, 1994 | [JP] | Japan | 6-058558 |
| Jun. 10, 1994 | [JP] | Japan | 6-151788 |
| Jun. 10, 1994 | [JP] | Japan | 6-151792 |

[51] Int. Cl.$^6$ ............... G09G 3/36; G09G 5/02; G02F 1/1347; G02F 1/1335

[52] U.S. Cl. ............... 345/88; 345/152; 348/752; 349/78; 349/102; 349/103; 349/118; 349/181

[58] Field of Search ............... 345/88, 150, 152; 349/78, 101, 102, 103, 117, 118, 180, 181; 348/752

[56] References Cited

U.S. PATENT DOCUMENTS

| 5,043,917 | 8/1991 | Okamoto | 364/518 |
| 5,056,896 | 10/1991 | Iimura et al. | 359/63 |
| 5,122,783 | 6/1992 | Bassetti, Jr. | 340/701 |
| 5,142,393 | 8/1992 | Okumura et al. | 359/73 |
| 5,150,237 | 9/1992 | Iimura et al. | 359/73 |
| 5,153,568 | 10/1992 | Shaw | 340/703 |
| 5,264,835 | 11/1993 | Shaw et al. | 345/150 |
| 5,341,153 | 8/1994 | Benzschawel et al. | 345/152 |
| 5,418,547 | 5/1995 | Mizukata et al. | 345/98 |
| 5,485,293 | 1/1996 | Robinder et al. | 359/59 |
| 5,585,950 | 12/1996 | Nishino et al. | 349/118 |
| 5,646,644 | 7/1997 | Furuhashi et al. | 345/100 |

*Primary Examiner*—Mark R. Powell
*Assistant Examiner*—John W. Miller
*Attorney, Agent, or Firm*—Frishauf, Holtz, Goodman, Langer & Chick

[57] ABSTRACT

A color liquid crystal display apparatus comprises an ECB (Electrically Controlled Birifringence) type liquid crystal display device, which has a plurality of dots arranged in a matrix form and displays a plurality of colors in accordance with applied voltages dot by dot, and a driving circuit. The driving circuit includes an image memory, a display controller, a conversion table, a D/A converter and drivers. The display controller reads image data stored in the image memory. This image data defines a display color of a pixel consisting of a plurality of dots and a gradation. The conversion table converts image data to voltage data defining voltages to be applied to a plurality of dots of the liquid crystal display device in order to display the color and gradation defined by the image data. The D/A converter converts this voltage data to an analog voltage and the drivers apply this analog voltage to each dot of the liquid crystal display device. The color and gradation defined by the image data are expressed by the visual combination of the display colors of a plurality of dots constituting each pixel. The thicknesses of the liquid crystal layer at a plurality of dots constituting each pixel in the ECB liquid crystal display device differ from one another.

23 Claims, 26 Drawing Sheets

19

| ADDRESS | | | | | | STORED DATA (VOLTAGE DATA) | | | | | | | | |
|---|---|---|---|---|---|---|---|---|---|---|---|---|---|---|
| R1 | R2 | G1 | G2 | B1 | B2 | 1ST DOT | | | 2ND DOT | | | 3RD DOT | | |
| 0 | 0 | 0 | 0 | 0 | 0 | 0 | 1 | 0 | 0 | 1 | 1 | 1 | 1 | 0 |
| 0 | 0 | 0 | 0 | 0 | 1 | 0 | 1 | 0 | 0 | 1 | 0 | 0 | 1 | 0 |
| 0 | 0 | 0 | 0 | 1 | 0 | 0 | 1 | 0 | 0 | 1 | 0 | 0 | 0 | 1 |
| 0 | 0 | 0 | 0 | 1 | 1 | 1 | 0 | 1 | 1 | 1 | 0 | 0 | 0 | 0 |
| ⋮ | ⋮ | ⋮ | ⋮ | ⋮ | ⋮ | ⋮ | | | ⋮ | | | ⋮ | | |
| 1 | 1 | 1 | 1 | 1 | 1 | 1 | 1 | 1 | 1 | 1 | 1 | 1 | 1 | 1 |

| ADDRESS IN AREA | | | | VOLTAGE DATA | ADDRESS IN AREA | | | | VOLTAGE DATA |
|---|---|---|---|---|---|---|---|---|---|
| 0 | 0 | 0 | 0 | V1 V2 V3 | 0 | 0 | 0 | 0 | V1 V2 V3 |
| 0 | 0 | 0 | 1 | V2 V4 V3 | 0 | 0 | 0 | 1 | V3 V4 V3 |
| --- | | | | --- | --- | | | | --- |
| 1 | 1 | 1 | 1 | V6 V6 V6 | 1 | 1 | 1 | 1 | V6 V6 V6 |

| ADDRESS IN AREA | | | | VOLTAGE DATA |
|---|---|---|---|---|
| 0 | 0 | 0 | 0 | V1 V2 V3 |
| 0 | 0 | 0 | 1 | V4 V3 V4 |
| --- | | | | --- |
| 1 | 1 | 1 | 1 | V6 V6 V6 |

FIG.11

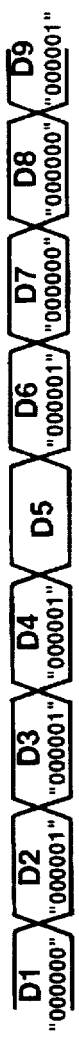
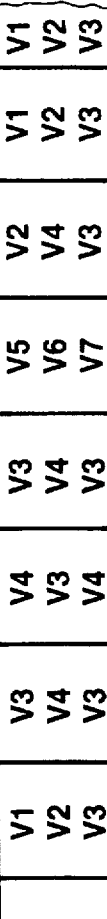
FIG.12A CK
FIG.12B IMAGE DATA
FIG.12C DELAY IMAGE DATA
FIG.12D SC
FIG.12E SE
FIG.12F SF
FIG.12G OUTPUT OF D/A 21A / OUTPUT OF D/A 21B / OUTPUT OF D/A 21C
FIG.12H DISPLAY COLOR OF FIRST DOT / DISPLAY COLOR OF SECOND DOT / DISPLAY COLOR OF THIRD DOT

FIG.14A

| DISPLAY COLOR | WHITE | WHITE | WHITE | GRADATION 4 |
|---|---|---|---|---|
| APPLIED VOLTAGE | V0 | V0 | V0 | |

FIG.14B

| WHITE | BLUISH GREEN | PURPLISH RED | GRADATION 3 |
|---|---|---|---|
| V0 | V2 | V2 | |

FIG.14C

| BLUISH GREEN | PURPLISH RED | LIGHT WHITE | GRADATION 2 |
|---|---|---|---|
| V2 | V3 | V4 | |

FIG.14D

| LIGHT WHITE | LIGHT WHITE | LIGHT WHITE | GRADATION 1 |
|---|---|---|---|
| V4 | V4 | V4 | |

FIG.15A

| BLUISH GREEN | LIGHT WHITE | LIGHT WHITE |
|---|---|---|
| V2 | V4 | V4 |

HIGH GRADATION

FIG.15B

| BLUISH GREEN | BLUISH GREEN | LIGHT WHITE |
|---|---|---|
| V2 | V2 | V4 |

LOW GRADATION

19

| ADDRESS | STORED DATA (VOLTAGE DATA) | | |
|---|---|---|---|
| R1 R2 G1 G2 B1 B2 | 1ST DOT | 2ND DOT | 3RD DOT |
| 0 0 0 0 0 0 | 1 0 0 | 1 0 0 | 1 0 0 |
| 0 0 0 0 0 1 | 0 1 0 | 0 1 0 | 0 1 0 |
| 0 0 0 0 1 0 | 0 1 0 | 0 1 0 | 0 0 1 |
| 0 0 0 0 1 1 | 1 0 1 | 1 1 0 | 0 0 0 |
| ⋮ | ⋮ | ⋮ | ⋮ |
| 1 0 1 0 1 0 | 0 0 0 | 0 1 0 | 0 1 1 |
| ⋮ | ⋮ | ⋮ | ⋮ |
| 1 1 1 1 1 1 | 0 0 0 | 0 0 0 | 0 0 0 |

BIRIFRINGENCE CONTROL TYPE LIQUID CRYSTAL DISPLAY DEVICE AND APPARATUS AND METHOD OF DRIVING THE SAME

BACKGROUND OF THE INVENTION

1. Field of the Invention

The present invention relates to a birifringence control type liquid crystal display device for displaying colors according to applied voltages, a display apparatus using the birifringence control type liquid crystal display device, and a method of driving the birifringence control type liquid crystal display device.

2. Description of the Related Art

Liquid crystal (LC) display devices for displaying a color image are generally equipped with color filters for primary colors (red, green and blue).

The transmittivity of a color filter is low. Therefore, while a color LC display device using color filters can be used as a transmission type device having a light source arranged at the back, it cannot be used as a reflection type color LC display device due to the dark display.

An electrically controlled birifringence (ECB) type LC display device is known which can display a color image without using a color filter. The ECB type LC display device comprises an LC cell where liquid crystal is sealed, and two polarization plates arranged so as to sandwich the LC cell. The ECB type LC display device alters the molecular alignment of the liquid crystal by an applied electric field. When the molecular alignment changes, the birifringence of the LC layer changes and the polarization state of light passing the LC cell varies. Accordingly, the spectrum distribution of the light leaving the polarization plate on the outgoing side varies, displaying the desired color.

Since the ECB type LC display device does not cause light absorption by a color filter, the display is bright. The ECB type LC display device can therefore be used as a reflection type color LC display device, and still has an advantage of having a simple structure.

But, the number of colors the conventional ECB type LC display device can display is limited to the number of applied voltages. As the displayed colors pass a predetermined locus on a chromaticity diagram with respect to a change in applied voltage, some colors one really wants to display may not be displayed in some cases. Further, as the gradation (brightness) changes with a change in displayed color, it is difficult to effect the gradation display.

SUMMARY OF THE INVENTION

Accordingly, it is an object of the present invention to provide an LC display device and an LC display apparatus, which can display colors (hue and gradation) close to the real colors to be displayed, and a method of driving the same.

It is another object of this invention to provide an LC display device and an LC display apparatus, which can display colors greater in number than the types (number) of applied voltages, and a method of driving the same.

It is a further object of this invention to provide a birifringence control type LC display apparatus capable of controlling the gradation of a display image, and a method of driving the same.

To achieve the above objects, according to one aspect of this invention, there is provided an LC display apparatus comprising:

a liquid crystal display device having a plurality of dots arranged in a matrix form, for displaying a plurality of colors in accordance with applied voltages dot by dot;

reception means for receiving data defining a display color of each pixel consisting of a plurality of dots;

conversion means for performing conversion to data defining applied voltages to a plurality of dots constituting each pixel in order to display the display color of each pixel defined by the received data by a combined display of the dots constituting that pixel; and drive means for applying a voltage corresponding to data from the conversion means to the liquid crystal display device to display the display color of each pixel by a combined display of a plurality of dots.

According to another aspect of this invention, there is provided a method of driving a liquid crystal display device for displaying colors in accordance with applied voltages dot by dot, which method comprises:

a conversion step of receiving image data defining a display color of each pixel and converting the image data to applied voltages to a plurality of dots constituting that pixel; and a drive step of applying the applied voltages produced by the conversion step to the liquid crystal display device to drive the liquid crystal display device, thereby displaying the display color by a combined display of a plurality of dots.

According to a further aspect of this invention, there is provided an apparatus for driving a liquid crystal display device for displaying colors and gradations according to applied voltages dot by dot, which apparatus comprises:

conversion means for performing conversion to data defining applied voltages to a plurality of dots constituting the pixel in order to display a display color of each pixel defined by image data defining the display color of that pixel by a combined display of the individual dots constituting the pixel; and drive means having a connecting portion to connect to the liquid crystal display device, for applying a voltage corresponding to data from the conversion means to the liquid crystal display device.

According to a still further aspect of this invention, there is provided an LC display device for obtaining colored light by a birifringence effect, comprising:

a dot matrix type liquid crystal cell designed so that a liquid crystal layer has different thicknesses at a plurality of adjoining dots.

With regard to a color LC display apparatus which displays a color according to the applied voltage dot by dot, the colors displayable by individual dots are limited to the colors located on the locus of the applied voltage v.s. display color characteristic on a chromaticity diagram. Even when the applied voltage is changed, therefore, there are colors that cannot be displayed by the individual dots and the number of display colors is limited. Further, the number of applied voltages is also limited so that all the colors on the applied voltage v.s. display color characteristic on the chromaticity diagram cannot be displayed.

According to the structure of the present invention, however, since a color (hue and/or gradation) is expressed by a combined display (visual combination) of a plurality of dots, it is possible to display the colors which cannot be displayed simply by changing the applied voltage so that colors close to the real colors to be displayed can be displayed.

If an image is displayed by combined colors of a different number of dots, e.g., two dots or three dots, in accordance with the desirable color to be displayed, a finer color change can be expressed so that colors close to the real colors to be displayed can be displayed.

By altering the display characteristic of a plurality of dots constituting each pixel, it is possible to display the colors, which cannot be displayed by a simple combination of display colors of a plurality of unistructural dots.

BRIEF DESCRIPTION OF THE DRAWINGS

The accompanying drawing, which are incorporated in and constitute a part of the specification, illustrate presently preferred embodiments of the invention, and together with the general description given above and the detailed description of the preferred embodiments given below, serve to explain the principles on the invention.

FIG. 5 is a diagram exemplifying the structure of a conversion table shown in FIG. 2;

FIGS. 6A and 6B are diagrams showing examples of display colors of individual dots constituting one pixel;

FIG. 11 is a diagram showing the structure of a table ROM shown in FIG. 10;

FIGS. 12A through 12H are timing charts for explaining the operation of the conversion table having the structure shown in FIG. 10;

FIGS. 14A through 14D are diagrams showing examples of the combinations of the display colors of the individual dots when white is displayed with different gradations;

FIGS. 15A and 15B are diagrams showing examples of the combinations of the display colors of the individual dots when bluish green is displayed with different gradations;

FIG. 16 is a diagram showing the structure of a conversion table according to a third embodiment of this invention;

DETAILED DESCRIPTION OF THE PREFERRED EMBODIMENTS

Preferred embodiments of the present invention will now be described referring to the accompanying drawings.

First Embodiment

Figure 1:
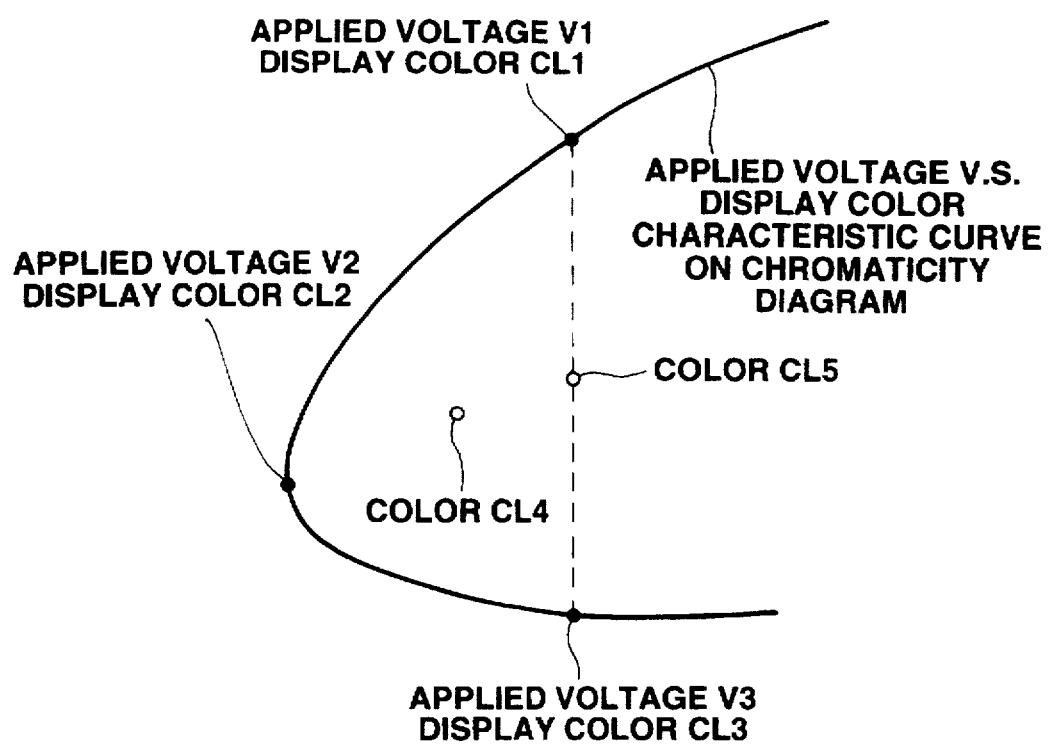
FIG. 1 is a diagram exemplifying the relation among voltages to be applied to an LC display device, colors displayable by the applied voltages and combined colors of those colors.

For a birifringence control type LC display device showing the voltage v.s. display color characteristic as shown in FIG. 1, the voltages to be applied to the liquid crystal are V1, V2 and V3, and the display colors for those applied voltages are CL1, CL2 and CL3. In this case, a color CL4 lying nearly in the middle of the colors CL1, CL2 and CL3 on the chromaticity diagram cannot be displayed by a single pixel but can be displayed by the color mixture (combination) of the colors CL1, CL2 and CL3.

According to the first embodiment, therefore, one pixel consists of three dots (three display dots) and the desirable color to be displayed is provided by the color mixture (visual combination) of the display colors of three dots.

The structure of an electrically controlled birifringence (ECB) type LC display apparatus according to the first embodiment of this invention will be described with reference to FIGS. 2 and 3.

Figure 2:
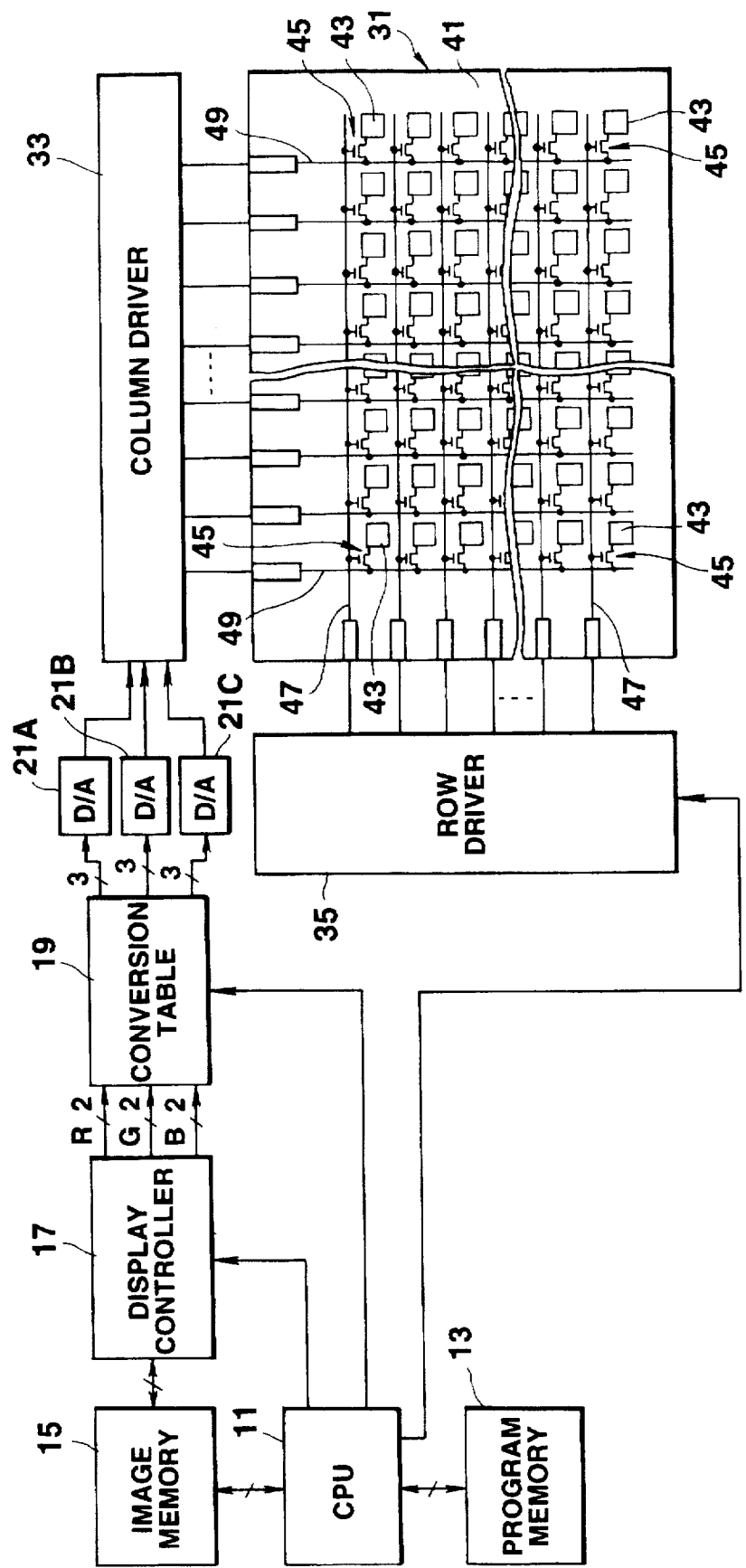
FIG. 2 is a circuit diagram of an LC display apparatus according to a first embodiment of the present invention.

As shown in FIG. 2, this LC display apparatus comprises: a CPU 11 which controls the overall system in accordance with a predetermined program; a program memory 13 in which the operation program of the CPU 11, e.g., an image forming program, is stored, an image memory (display memory) 15 in which image data is written by the CPU 11; a display controller 17 which sequentially reads image data from the image memory 15 under the control of the CPU 11; a conversion table 19 for converting the image data read by the display controller 17 to 3-bit digital voltage data for three dots; a D/A (Digital-to-Analog) converters 21A, 21B and 21C for converting the voltage data output from the conversion table 19 to an analog voltage; a birifringence control type active matrix LC display device 31; a column driver (drain driver) 33 which samples the output signals of the D/A converters 21A–21C and supplies the sampled signals to transparent pixel electrodes 43 via thin film transistors (hereinafter referred to as TFTs) 45; and a row driver (gate driver) 35 which turns on the TFTs 45.

Figure 3:
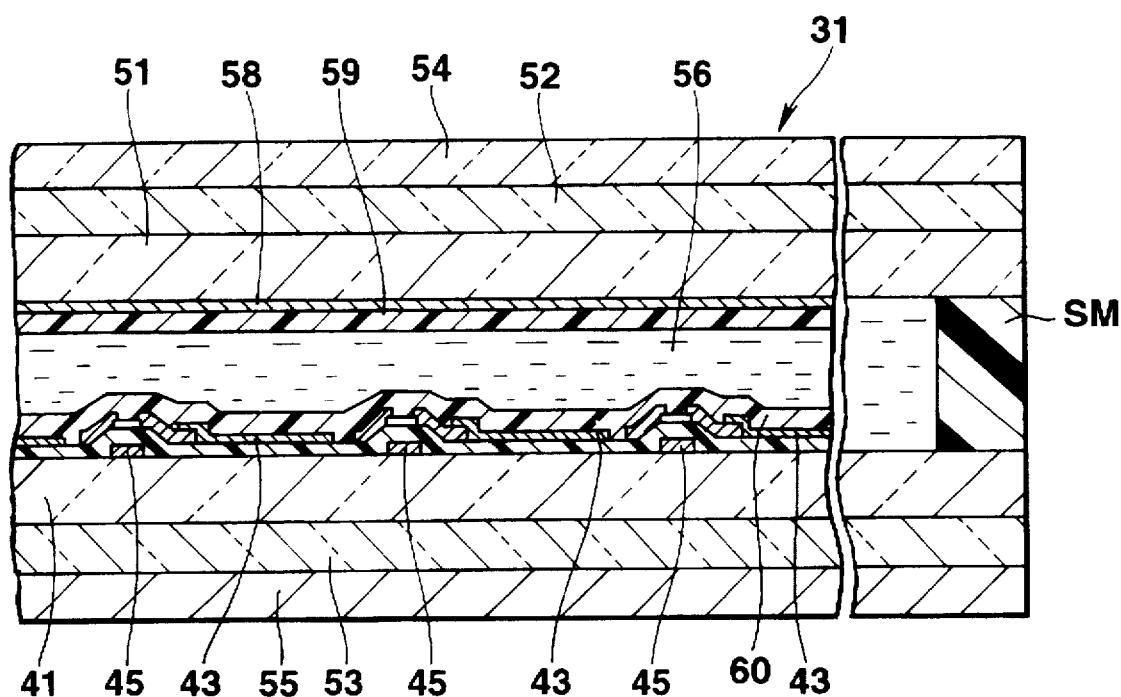
FIG. 3 is a cross-sectional view of the essential portions of an LC display device shown in FIG. 2.

As shown in FIG. 3, the LC display device 31 comprises: a pair of transparent substrates 41 and 51 (e.g., glass substrates) facing each other with a seal member SM in between; a liquid crystal 56 arranged between both substrates 41 and 51; a retardation plate 52 located on the transparent substrate 51; a pair of polarization plates 53 and 54 sandwiching those mentioned elements; and a reflector 55.

The pixel electrodes 43 and TFTs 45 having sources connected to the pixel electrodes 43 are arranged in a matrix form on the substrate 41 as shown in FIGS. 2 and 3. Gate lines (address lines) 47 are arranged in a row direction, and each gate line 47 is connected to the gate electrodes of the associated row of TFTs 45, as shown in FIG. 2. Data lines (color signal lines) 49 are arranged in a column direction, and each data line 49 is connected to the drains of the associated column of TFTs 45. An alignment film 60 undergone a predetermined aligning treatment is provided on the pixel electrodes 43 and the TFTs 45, as shown in FIG. 3. The polarization plate 53 is located at the back of the substrate 41, and the reflector 55 made of metal, such as aluminum, is provided at the back of the polarization plate 53.

A transparent opposing electrode 58 opposing the individual pixel electrodes 43 is formed on the substrate 51. An alignment film 59 undergone a predetermined aligning treatment is provided on the opposing electrode 58. The retardation plate 52 is provided on the top surface of the substrate 51, and the polarization plate 54 is provided on the top surface of this retardation plate 52.

Both substrates 41 and 51 are adhered via the frame-shaped seal member SM. The liquid crystal 56, which is, for example, a nematic liquid crystal having the positive dielectric anisotropy, is sealed in a twisted state in the area surrounded by both substrates 41 and 51 and the seal member SM.

The alignment direction of the LC molecules in the vicinity of the alignment film 59 is shifted about 90 degrees counterclockwise, for example, as viewed from the top with respect to the alignment direction of the LC molecules in the vicinity of the alignment film 60 (azimuth of 0 degree).

The transmission axis of the polarization plate 54 extends in the direction of 30 degrees with respect to the azimuth of 0 degree as viewed from the above. The transmission axis of the polarization plate 53 extends in the direction of 50 degrees with respect to the azimuth of 0 degree as viewed from the observing side. The phase delay axis of the retardation plate 52 is inclined to the transmission axis of the polarization plate 54.

The incident light to this device 31 passes the polarization plate 54, the retardation plate 52, the liquid crystal 56 and the polarization plate 53 in order, and is then reflected at the reflector 55. The reflected light sequentially passes the polarization plate 53, the liquid crystal 56, the retardation plate 52 and the polarization plate 54 and then leaves the device 31.

The phase delay axis of the retardation plate 52 is inclined to the transmission axis of the polarization plate 54. The linearly polarized light passing the polarization plate 54 becomes elliptically polarized light whose light components of individual wavelengths have different polarized states due to the birifringence effect while passing the retardation plate 52. This elliptically polarized light changes its polarized state by the birifringence effect while passing the liquid crystal 56, and then leaves the polarization plate 53. Only the component of the light of each wavelength in the direction of the transmission axis of the polarization plate 53 passes the polarization plate 53, and is reflected at the reflector 55.

This reflected light undergoes the polarizing effect and birifringence effect while sequentially passing the polarization plate 53, the liquid crystal 56 and the retardation plate 52, and then enters the polarization plate 54. Of the light having entered the polarization plate 54, only the polarized component in the direction of the transmission axis of the polarization plate 54 passes the polarization plate 54. As a result, the color according to the wavelength distribution of the transmitted light is displayed. The birifringence of the liquid crystal 56 changes in accordance with the voltage applied to the liquid crystal 56, and the spectrum distribution of the outgoing light changes in accordance with a change in birifringence. The display of the LC display device 31 therefore changes in accordance with the voltage applied to the liquid crystal 56.

Figure 4:
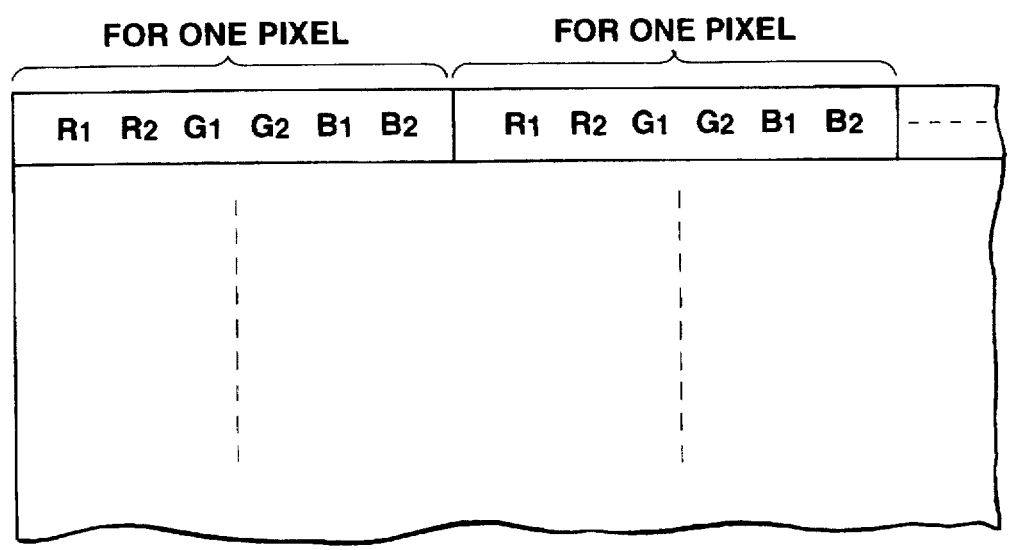
FIG. 4 is a diagram exemplifying image data to be stored in an image memory shown in FIG. 1.

The image data produced by the CPU 11 and stored in the image memory 15 includes, for example, 6-bit data per pixel as shown in FIG. 4. The two bits of the image data expresses the luminance of red (R), two bits expresses the luminance of green (G) and two bits expresses the luminance of blue (B). The combined color of those three colors corresponds to the desirable color that is to be displayed at each pixel.

The display controller 17 sequentially reads image data from the image memory 15 pixel by pixel and outputs the image data to the conversion table 19 under the control of the CPU 11.

As shown in FIG. 5, the conversion table 19 stores voltage data defining voltages to be applied to three dots constituting each pixel in order to display the color, defined by the image data, in each memory area expressed by the image data as an address. The conversion table 19 outputs voltage data for three dots, stored at the location addressed by the image data supplied from the display controller 17.

When the image data is "000000," for example, a voltage V2 corresponding to voltage data "010" is applied to the first dot of the associated pixel (more specifically, between the pixel electrode 43 of the first dot and the opposing electrode 58), a voltage V3 corresponding to voltage data "011" is applied to the second dot, and a voltage V6 corresponding to voltage data "110" is applied to the third dot. As shown in FIG. 6A, therefore, the dots respectively show colors C2, C3 and C6 corresponding to the applied voltages V2, V3 and V6, and those three colors are combined to display the color corresponding to the image data "000000."

When the image data is "000001," a voltage V2 corresponding to voltage data "010" is applied to the first to third dots of the associated pixel, and all the dots show the color C2 as shown in FIG. 6B. In this case, the combined color is also C2.

The voltage data stored in the conversion table 19 may be set as follows.

Figure 7:
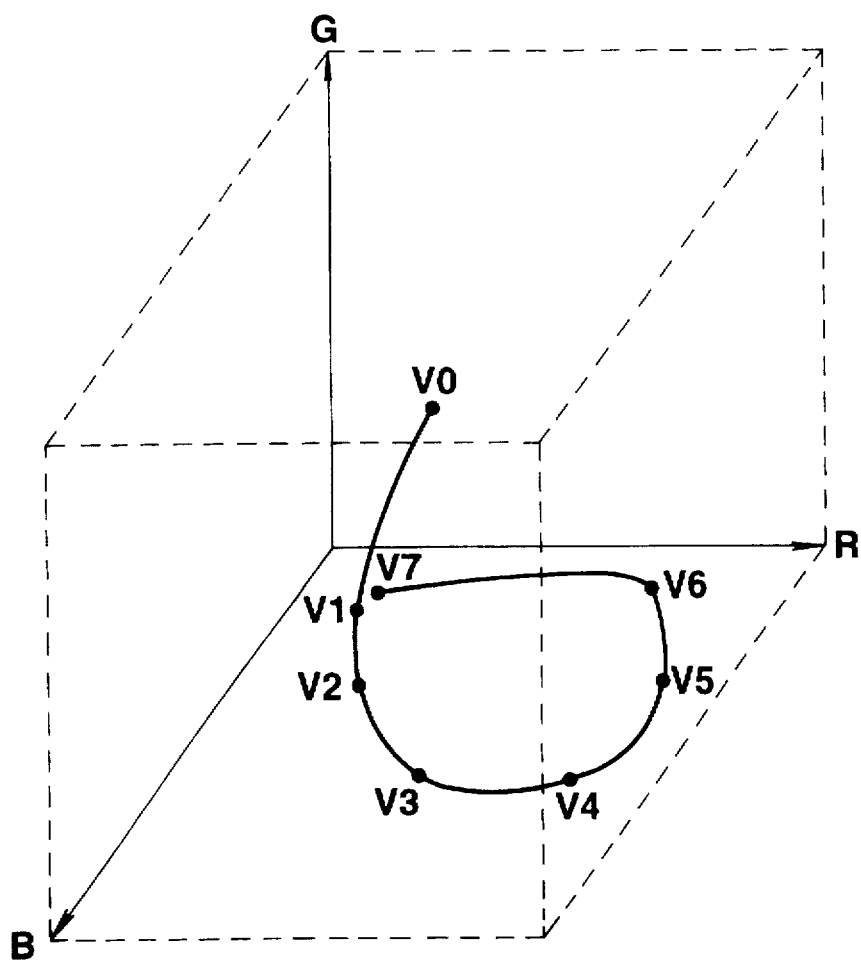
FIG. 7 is an RGB chromaticity diagram showing the relation between applied voltages and display colors.

First, the characteristic of the LC display device 31 (characteristic of a change in display color with respect to the applied voltage) is obtained as indicated in the RGB color space in FIG. 7, for example. Then obtained eight colors C0 to C7, which are displayed when eight voltages V0 (lowest) to V7 (highest) outputtable from the D/A converters 21A–21C are applied.

For each of 64 ($2^2 \times 2^2 \times 2^2$) defined by 6-bit image data, the colors to be displayed at the three dots to approximate that color is selected from the eight colors C0–C7. Then, the voltage data corresponding to the selected display color is set in the associated memory area in the conversion table 19.

The D/A converters 21A, 21B and 21C perform D/A conversion of the voltage data for the first dot, the voltage data for the second dot and the voltage data for the third dot output from the conversion table 19, respectively.

Figure 8:
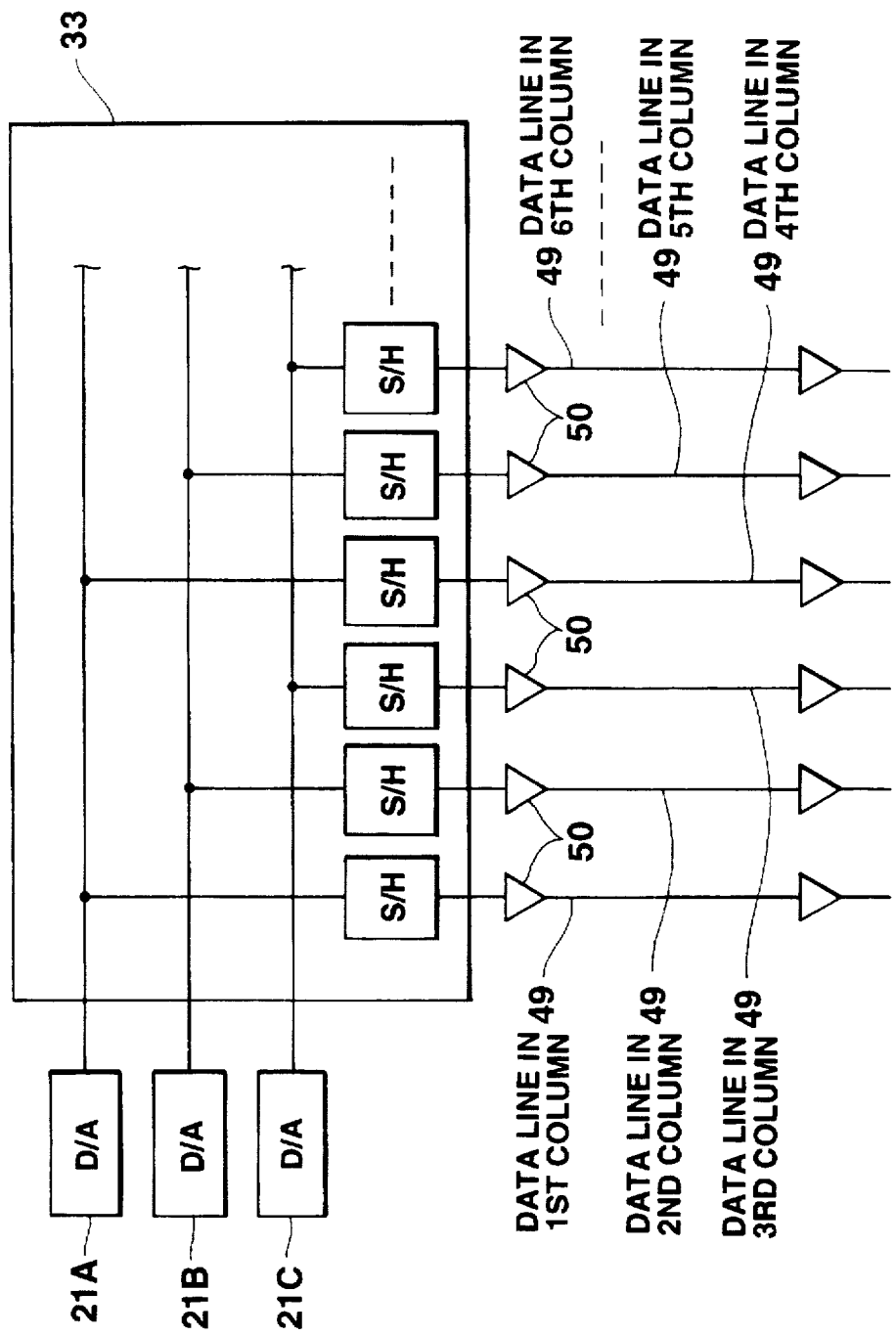
FIG. 8 is a diagram showing the structure of a column driver shown in FIG. 2.

As shown in FIG. 8, the column driver 33 has a plurality of sample and hold circuits S/H. The output signal of the D/A converter 21A is supplied to the sample and hold circuit S/H connected to the data line 49 (n=0, 1, 2, . . . ) in the (3n+1)-th column. The output signal of the D/A converter 21B is supplied to the sample and hold circuit S/H connected to the data line 49 in the (3n+2)-th column. The output signal of the D/A converter 21C is supplied to the sample and hold circuit S/H connected to the data line 49 in the (3n+3)-th column.

Each sample and hold circuit S/H samples the supplied analog voltage and sends the signal, sampled previously by one horizontal scan period, to the associated data line 49 via a voltage amplifier or level shifter 50.

The row driver 35 sequentially applies a gate pulse of a predetermined pulse width to the gate lines 47 in accordance with the timing signal from the CPU 11. The TFTs 45 connected to the gate line 47 to which the gate pulse is applied is turned on. Voltages (write voltages) V0–V7 corresponding to display colors are applied to the pixel electrodes 43 connected to the activated TFTs 45. That is, the voltages are applied to the associated dots.

The row driver 35 disables the gate pulse immediately before the voltage applied to the data line 49 is switched. Then, the TFTs 45 connected to the gate line 47 are turned off, and the write voltages applied to that point are held in the capacitors (pixel capacitors) formed by the pixel electrodes 43, the opposing electrode 51 and the liquid crystal 56 lying between both electrodes 43 and 51.

The voltages held in the pixel capacitors maintain the alignment states of the LC molecules to keep the desired display colors.

The operation of the LC display apparatus shown in FIG. 1 will be described below.

The CPU 11 runs the program stored in the program memory 13, and properly writes image data defining an image to be displayed in the image memory 15.

The image data written in the image memory 15 by the CPU 11 is read pixel by pixel (six bits each) by the display controller 17, and is sequentially supplied to the address terminals of the conversion table 19. One pixel (three dots) of voltage data stored at the location addressed by the image data in the conversion table 19 is supplied to the associated D/A converter 21A, 21B or 21C.

Figure 9:
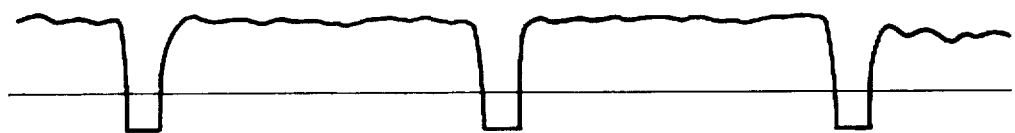
FIG. 9 is a diagram exemplifying the output signal of a D/A converter.

Each D/A converter 21A, 21B or 21C converts the 3-bit voltage data sequentially supplied from the conversion table 19 to an analog voltage, and outputs it as an analog video signal containing a sync signal as shown in FIG. 9.

Each sample and hold circuit S/H in the column driver 33 samples the analog voltage, supplied from the associated D/A converter 21A, 21B or 21C, and the sampled voltage is amplified by the associated voltage amplifier 50 and is applied to the associated data line 49 in the next horizontal scan period.

The row driver 35 sequentially applies the gate pulse to the gate lines 47 in accordance with the timing signal from the CPU 11 to sequentially select (scan) the TFTs 45. Write voltages corresponding to the display colors are applied via the TFTs 45 to the pixel electrodes 43 of the selected row from the data line 49.

The row driver 35 disables the gate pulse immediately before the voltage applied to the data line 49 is switched. Consequently, the TFTs 45 which have been turned on are turned off, and the write voltages applied to that point are held in the capacitors formed by the pixel electrodes 43, the opposing electrode 51 and the liquid crystal 56 lying between both electrodes 43 and 51. The alignment states of the LC molecules are kept to the states corresponding to the held voltages, and the display colors are maintained dot by dot. The display color of each dot corresponds to the voltage data output from the conversion table 19, and the mixed color (combined color) of the display colors of three dots of each pixel corresponds to the color defined by the image data output from the image memory 15.

By repeating the above operation, the color defined by the image data stored in the image memory 15 is displayed on the LC display device 31 as the mixed color of the display colors of the three dots.

Second Embodiment

The color CL5 lying nearly in the middle between the colors CL1 and CL3 in FIG. 1 is displayed better by the mixed color of the display colors of two dots than by the mixed color of the display colors of three dots. The following will describe an LC display apparatus according to the second embodiment which can switch between the display of the mixed color of the display colors of three dots and the display of the mixed color of the display colors of two dots, with reference to FIG. 10.

In this embodiment, when the defined color of a plurality of adjoining pixels are the same with each other, two colors are displayed every two dots, thereby displaying the defined color by mixture of display colors of consecutive six dots. And, when the display colors of adjoining pixels are not the same with each other, the defined color is approximated by three dots.

It is to be noted that the other structure than the conversion table 19 of the LC display apparatus of this embodiment is the same as that shown in FIG. 2.

Figure 10:
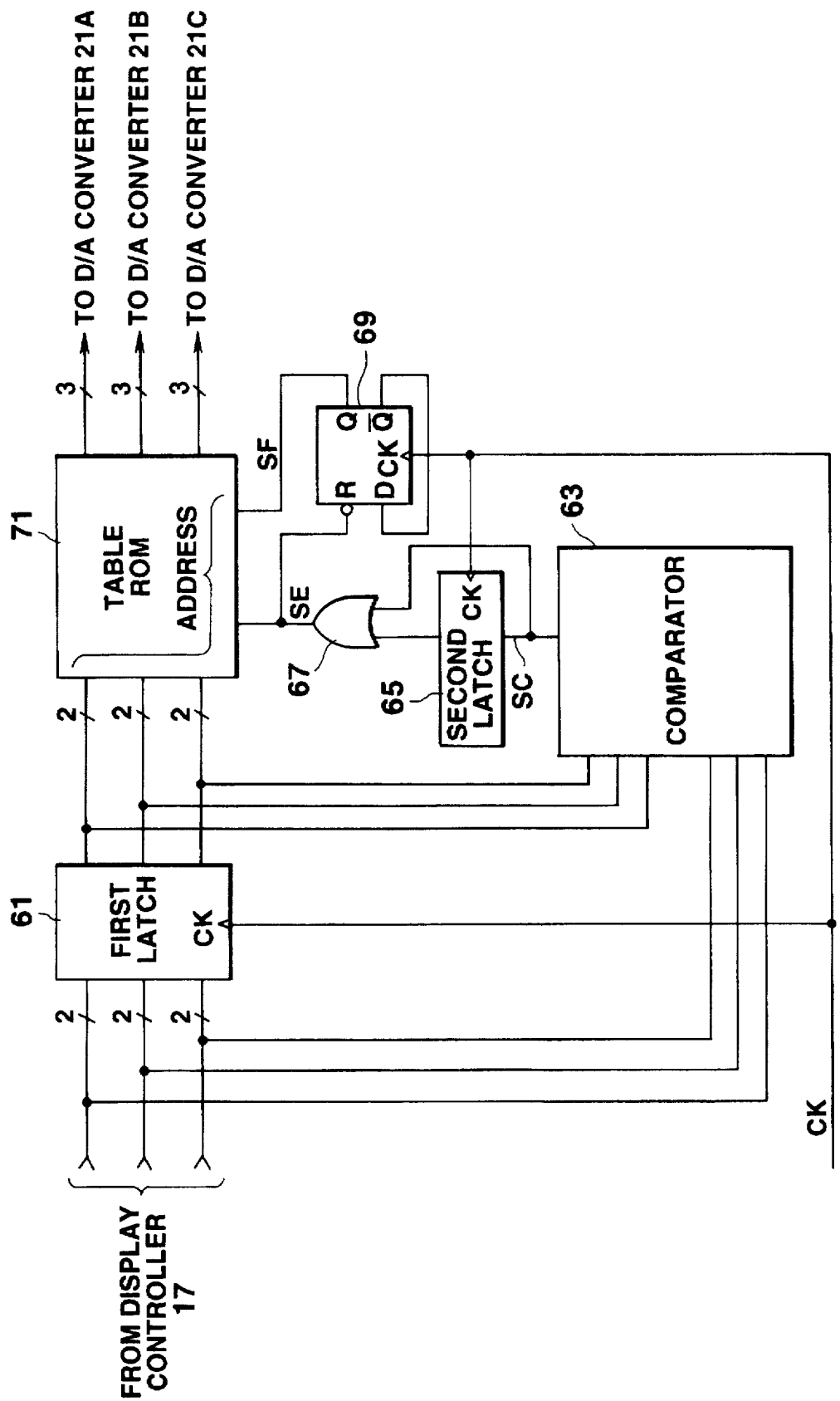
FIG. 10 is a diagram showing the structure of a conversion table according to a second embodiment of this invention.

As shown in FIG. 10, the conversion table 19 of this embodiment comprises: a first latch (6-bit latch) 61 for delaying an image signal from the display controller 17 by one clock period of a clock signal CK; a comparator 63 which compares the input data of the first latch 61 with its output data and outputs a high-level coincidence signal SC when there is a match; a second latch (1-bit latch) 65 for delaying the coincidence signal SC from the comparator 63 by one clock period; an OR gate 67 which obtains an logical sum of the output of the second latch 65 and the output SC of the comparator 63; a flip-flop 69 which inverts its output in response to the clock signal CK when the output signal of the OR gate 67 is at a high level; and a table ROM 71 which receives the image data from the first latch 61, the output SE of the OR gate 67 and the output SF of the flip-flop 69 at the address terminals, and outputs the associated voltage data for three dots.

The table ROM 71 has first to third memory areas which are selected in accordance with the output SE of the OR gate 67 and the output SF of the flip-flop 69, as shown in FIG. 11.

The memory location in each memory area is specified by the image data supplied from the first latch 61.

Voltage data (represented by voltages V0–V7 in FIG. 11) for displaying the color defined by the image data (address) by three dots is stored at each memory location in the first memory area selected by SE=SF="0."

Voltage data for displaying the color defined by the image data by two dots and for odd-numbered pixels is stored at each memory location in the second memory area selected by SE="1" and SF="0."

Voltage data for displaying the color defined by the image data by two dots and for even-numbered pixels is stored at each memory location in the third memory area selected by SE=SF="1."

9

The display of the mixed color of the display colors of two dots is not systematic in the case where the color specified by the image data is better reproduced with fidelity by the approximation by the mixed color of the display colors of three dots than by the approximation by the mixed color of the display colors of two dots. In the aforementioned case, therefore, voltage data for displaying the color specified by the image data by the color mixture of the display colors of three dots is stored in each memory location in the second and third memory areas. This voltage data is the same as the voltage data stored in the first memory area.

Referring now to FIGS. 12A through 12H, the operation of the LC display apparatus equipped with the conversion table 19 having the structure shown in FIG. 10 will be described.

Suppose that image data D1–D9 shown in FIG. 12B are sequentially output from the display controller 17, D1=D7 =D8="000000," D2=D3=D4=D6=D9="000001," and D1, D5 and D2 are not equal to one another.

The first latch 61 delays the supplied image data by one clock period of the clock signal CK shown in FIG. 12A, and supplies the image data to the address terminals of the table ROM 71 at the timing shown in FIG. 12C.

The comparator 63 compares the original image data with the image data delayed by the first latch 61, and outputs the high-level coincidence signal SC as shown in FIG. 12D when both image data match with each other. That is, when the same image data arrives by two or more pixels consecutively, the comparator 63 outputs the coincidence signal SC.

The second latch 65 delays the coincidence signal SC from the comparator 63 by one clock period. Accordingly, the output signal SE of the OR gate 67 becomes the coincidence signal SC of the comparator 63 whose pulse width is extended by one clock as shown in FIG. 12E.

The flip-flop 69 is reset while the output signal SE of the OR gate 67 is at a "0" level. When the output signal SE of the OR gate 67 becomes a "1" level, the Q output of the flip-flop 69 is inverted in response to the clock signal CK. Therefore, when the same image data is consecutively supplied to the table ROM 71, the output signal SF of the flip-flop 69 becomes a high level for the even-numbered pieces of the consecutively supplied image data, as shown in FIG. 12F.

At the timing at which image data D1="000000" is supplied to the address terminals of the table ROM 71 (it is assumed that the previous image data is other than "000000"), the signals SE and SF are at a low level. Therefore, the first memory area of the table ROM 71 is selected, and voltage data for three dots stored at the memory location at the image data "000000" as the address is read and sent to the D/A converters 21A–21C. The output voltages of the D/A converters 21A–21C become V1, V2 and V3 as shown in FIG. 12G. The output voltages are sampled by the column driver 33 and are applied to the associated pixel electrodes 43 in the next horizontal scan period.

Accordingly, the display colors of the individual dots constituting the associated pixel become C1, C2 and C3 as shown in FIG. 12H. The mixed color (visually combined color) of those three colors becomes the color specified by the image data "000000."

At the timing at which image data D2="000001" is supplied to the table ROM 71, the signal SE becomes "1" and the signal SF becomes "0", and the second memory area of the table ROM 71 is selected. Voltage data stored at the memory location at the address "000001" in the second memory area is read and sent to the D/A converters 21A–21C. As mentioned above, this voltage data is for the approximation of the color specified by the image data by two dots, and is voltage data for an odd-numbered pixel. In this case, the output voltages of the D/A converters 21A–21C become V3, V4 and V3 as shown in FIGS. 11 and 12G. The output voltages are sampled by the column driver 33 and are applied to the respective dots in the next horizontal scan period. Accordingly, the display colors of the individual dots constituting the associated pixel become C3, C4 and C3 as shown in FIG. 12H.

At the timing at which image data D3 is supplied to the table ROM 71, the signals SE and SF become "1" and the third memory area of the table ROM 71 is selected. Voltage data stored at the memory location at the address "000001" in the third memory area is read. This voltage data is for the approximation of the color specified by the image data by two dots, and is voltage data for an even-numbered pixel. The output voltages of the D/A converters 21A–21C become V4, V3 and V4, which are the voltage data for the combined color of two dots following the previous odd-numbered outputs of the D/A converters 21A–21C, as shown in FIG. 12G. Accordingly, the display colors of the individual dots constituting the associated pixel become C4, C3 and C4 as shown in FIG. 12H.

The display colors of the individual dots of two pixels corresponding to the image data D2 and D3 are arranged in the order of C3, C4, C3, C4, C3 and C4, and the intermediate color of the colors C3 and C4 is expressed by the mixed color of the display colors of six dots.

At the timing at which image data D6="000001" is supplied to the table ROM 71, SE=SF="0." In this case, the first memory area of the table ROM 71 is selected. Voltage data stored in the first memory area is read, and the output voltages of the D/A converters 21A–21C become V2, V4 and V3 as shown in FIG. 12G. Accordingly, the display colors of the individual dots constituting the associated pixel become C2, C4 and C3 as shown in FIG. 12H.

Even for the same image data "000001," it is apparent that the display colors of the individual dots vary depending on whether or not the image data is supplied consecutively. That is, when the defined display colors of a plurality of consecutive pixels on a same scanning line are same with each other, the defined display colors are approximated by display colors of two dots. And when the defined display colors of consecutive pixels on a same scanning line are not same, the defined display colors are approximated by display colors of three dots.

The table ROM 71 may have only the second and third memory areas.

Third Embodiment

Although the "color" which cannot be expressed by each dot is displayed by the mixed color of the display colors of a plurality of dots in the first and second embodiments, the "gradation" which cannot be expressed by each dot may be expressed in the same manner.

Figure 13A:
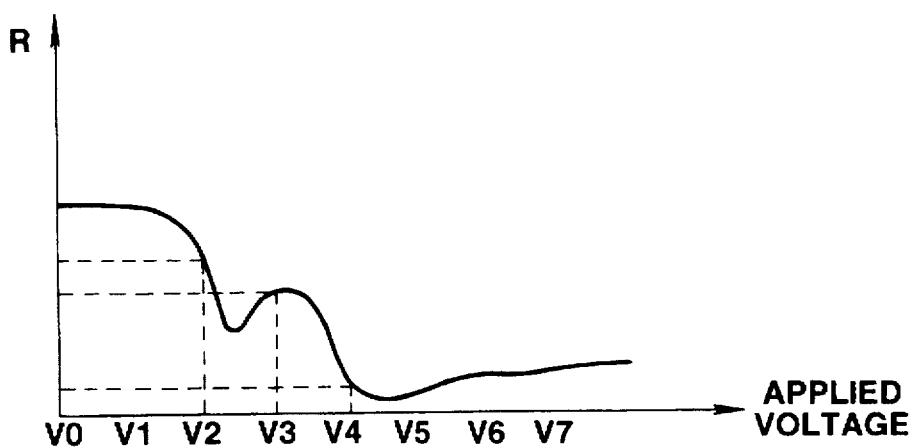
FIG. 13A is a diagram exemplifying a change in gradation (reflectance R) with respect to an applied voltage to a birifringence control type LC display apparatus.
Figure 13B:
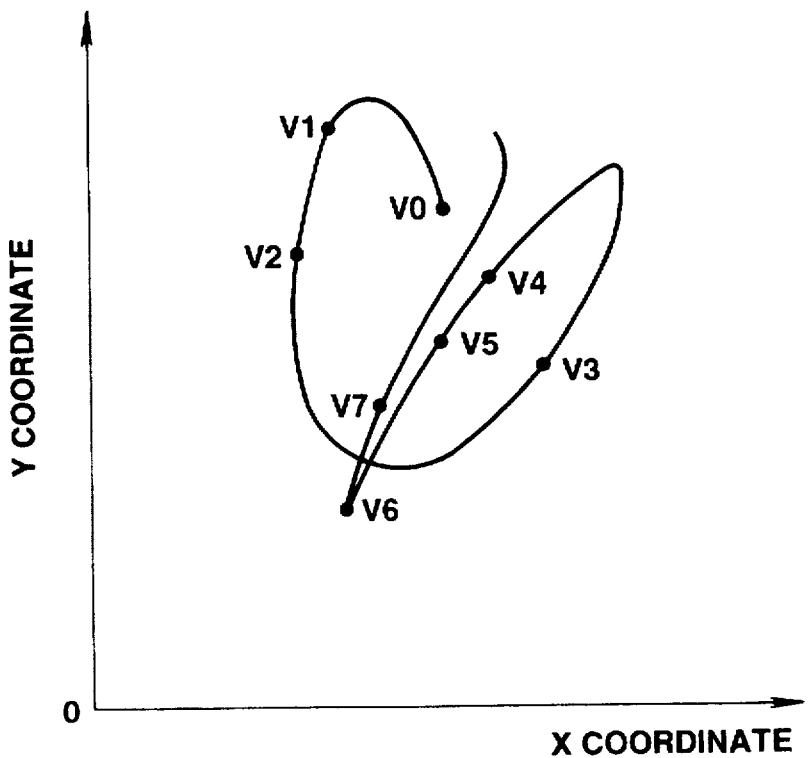
FIG. 13B is a CIE chromaticity diagram showing a change in display color with respect to an applied voltage.

FIG. 13A shows the relationship between the applied voltage to each dot (display dot) of the above-described ECB type LC display device and the ration of the intensity of outgoing light to the intensity of incidental light (reflectance R), and FIG. 13B is a CIE chromaticity diagram showing the relationship between the applied voltage and the display color.

The LC display device having such a characteristic can display white in different gradations by the combinations of the colors of three dots as shown in FIGS. 14A through 14D.

For example, white in gradation 4 (highest gradation) can be expressed by displaying white on all the three dots, white in gradation 3 can be expressed by the combination of white, bluish green and purplish red respectively displayed on the three dots, white in gradation 2 can be expressed by the combination of bluish green, reddish purple and light white (hueless and low luminance, or gray) respectively displayed on the three dots, and white in gradation 1 can be expressed by displaying light white on all the three dots.

Likewise, bluish green in a high gradation can be expressed by displaying bluish green on one of the three dots and light white on the remaining two, as shown in FIG. 15A, and bluish green in a low gradation can be expressed by displaying bluish green on two of the three dots and light white on the remaining one, as shown in FIG. 15B.

Arbitrary gradations can be expressed by setting the data stored in the conversion table 19 in such a way as to provide such combinations.

FIG. 16 shows an example of the conversion table 19 constituted in this manner.

When image data is "000000" (light white), for example, a voltage V4 corresponding to voltage data "100" is applied to the pixel electrodes 43 of the individual dots of the associated pixel. Accordingly, "light white" corresponding to the applied voltage is displayed on the individual dots as shown in FIG. 14D, and those three colors are combined to give white in gradation 1 corresponding to the image data "000000."

When image data is "101010" (white in gradation 3), for example, a voltage V0 corresponding to voltage data "000" is applied to the pixel electrode 43 of the first dot of the associated pixel, a voltage V2 corresponding to voltage data "010" is applied to the pixel electrode 43 of the second dot, and a voltage V3 corresponding to voltage data "011" is applied to the pixel electrode 43 of the third dot. Accordingly, white, bluish green and purplish red corresponding to the applied voltages are displayed on the three dots as shown in FIG. 14B, and those three colors are combined to give white in gradation 3 corresponding to the image data "101010."

The stored data (voltage data) in the conversion table 19 may be set in the following manner.

First, the characteristic of the birifringence control type LC display device 31 (characteristic of a change in display color and gradation (reflectance) with respect to the applied voltage) is obtained. Then, for the combination of the color defined by each image data and the gradation, the combination of the display colors of three dots and gradation for combining the color and gradation, is obtained from colors C0 to C7. Then, voltage data corresponding to the selected display color is set in the associated memory area in the conversion table 19. If the color defined by the image data and the gradation cannot be combined accurately, the combination of the colors which is the approximation of the combination of the defined color and gradation is obtained and is set in the associated memory area.

The color defined by the image data may be expressed by the combination of the colors of two dots as per the second embodiment. Further, the color defined by the image data may be expressed by the combination of the colors of three or more dots. The number of bits in image data may be set to seven bits or greater. Although there are eight types of applied voltages, V0 to V7, to the liquid crystal, the number of the types of the applied voltages may be set greater. In this case, the number of bits in voltage data should be changed in accordance with the types of the applied voltages.

Figure 17:
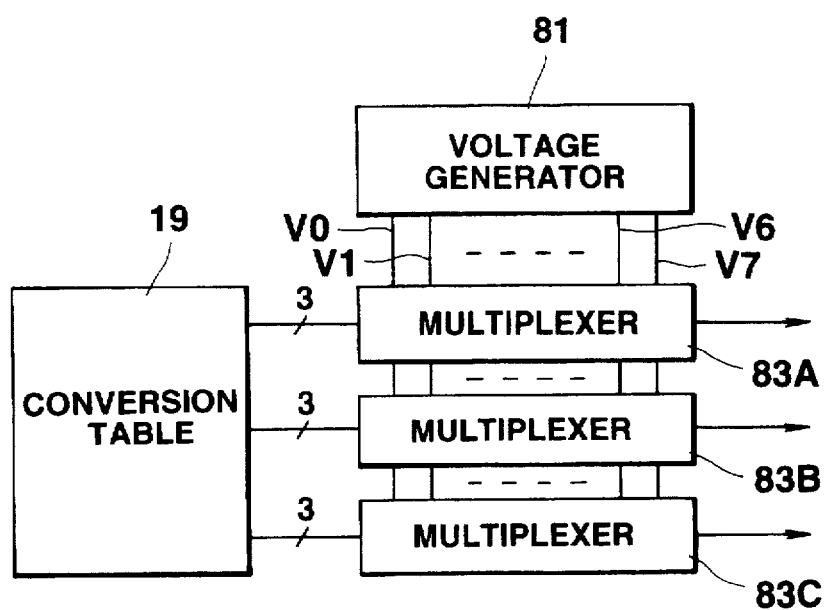
FIG. 17 is a diagram showing another example of the structure for converting voltage data to an analog voltage.

Although the voltage data output from the conversion table 19 is subjected to D/A conversion by the D/A converter to obtain the analog voltage to be applied to each pixel electrode 43 in the above-described embodiments, another method may also be used. For instance, the voltages V0–V7 output from a voltage generator 81 may be selectively supplied to the column driver 33 by multiplexers 83A, 83B and 83C, as shown in FIG. 17. The voltage generator 81 is constituted of a voltage-dividing circuit, such as a resistor-based voltage-dividing circuit or a capacitor-based voltage-dividing circuit. Each of the multiplexers 83A, 83B and 83C selects one of the output voltages V0–V7 from the voltage generator 81 in accordance with the voltage data supplied from the conversion table 19, and sends the selected voltage to the column driver 33.

Figure 18A:
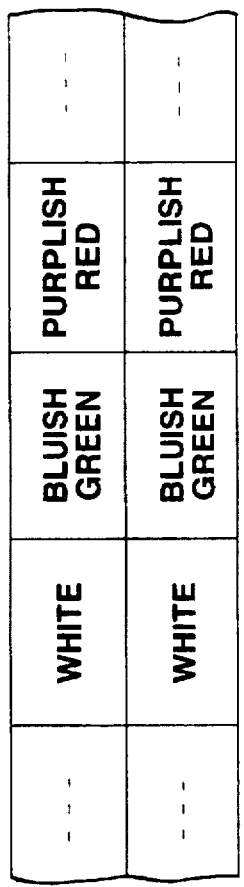
FIGS. 18A and 18B are diagrams exemplifying the arrangement of dots when the same color is displayed on a plurality of scan lines with the same gradation.
Figure 18B:

According to the first to third embodiments, when the same color in the same gradation is repeatedly displayed on a plurality of scan lines as shown in FIG. 18A, the colors of the individual dots on the upper scan line become the same as those on the lower scan line, producing a stripe pattern in the vertical direction of the screen. This problem may be overcome by changing the arrangement of the colors of the three dots constituting one pixel, as shown in FIG. 18B, scan line by scan line.

Figure 19:
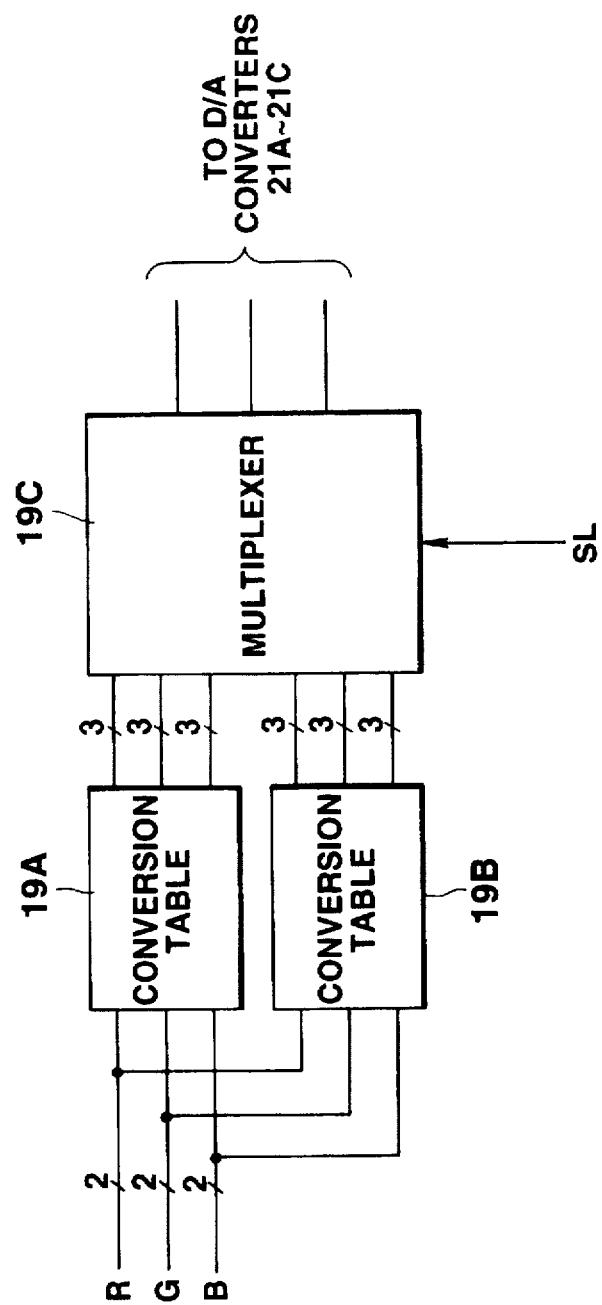
FIG. 19 is a diagram showing the structure of a conversion table which can ensure the dot arrangement shown in FIG. 17B.

To accomplish this function, the circuit structure as shown in, for example, FIG. 19 may be employed. This circuit comprises two conversion tables 19A and 19B where voltage data are stored in different arrangements, and a multiplexer 19C which selects one of the outputs of the conversion tables 19A and 19B in accordance with a scan line switch signal SL. The multiplexer 19C selects the voltage data output from the first conversion table 19A and supplies it to the D/A converters 21A–21C for odd-numbered scan lines, and selects the voltage data output from the second conversion table 19B and supplies it to the D/A converters 21A–21C for even-numbered scan lines.

Although the conversion table 19 is used to convert image data to voltage data in the first to third embodiments, another scheme may be used to perform such conversion.

The number of bits in each data in the first to third embodiments is just illustrative. For example, image data may consist of other than six bits, and the voltage data output from the conversion table 19 may consist four or more bits. Further, the types of voltages output from the D/A converters 21A–21C may be set equal to or greater than nine.

Although one pixel consists of two or three dots adjoining in the row direction in the above-described embodiments, one pixel may consist of a plurality of dots adjoining in the column direction. The number of dots constituting one pixel is not limited to those mentioned above.

Although the image obtained by data processing is displayed on the LC display device 31 in the above-described embodiments, this invention may also be applied to the case where another type of arbitrary color image is displayed on an ECB type LC display device. For example, this invention can be adapted for the case where a TV image is displayed on an ECB type LC display device.

Fourth Embodiment

The first to third embodiments employ the same structure of dots constituting each pixel and the same display characteristic. With the described structure, the colors which are expressed with a high purity are specified and some colors and gradations may not be displayed. The following will describe the fourth embodiment designed to overcome this problem.

Figure 20:
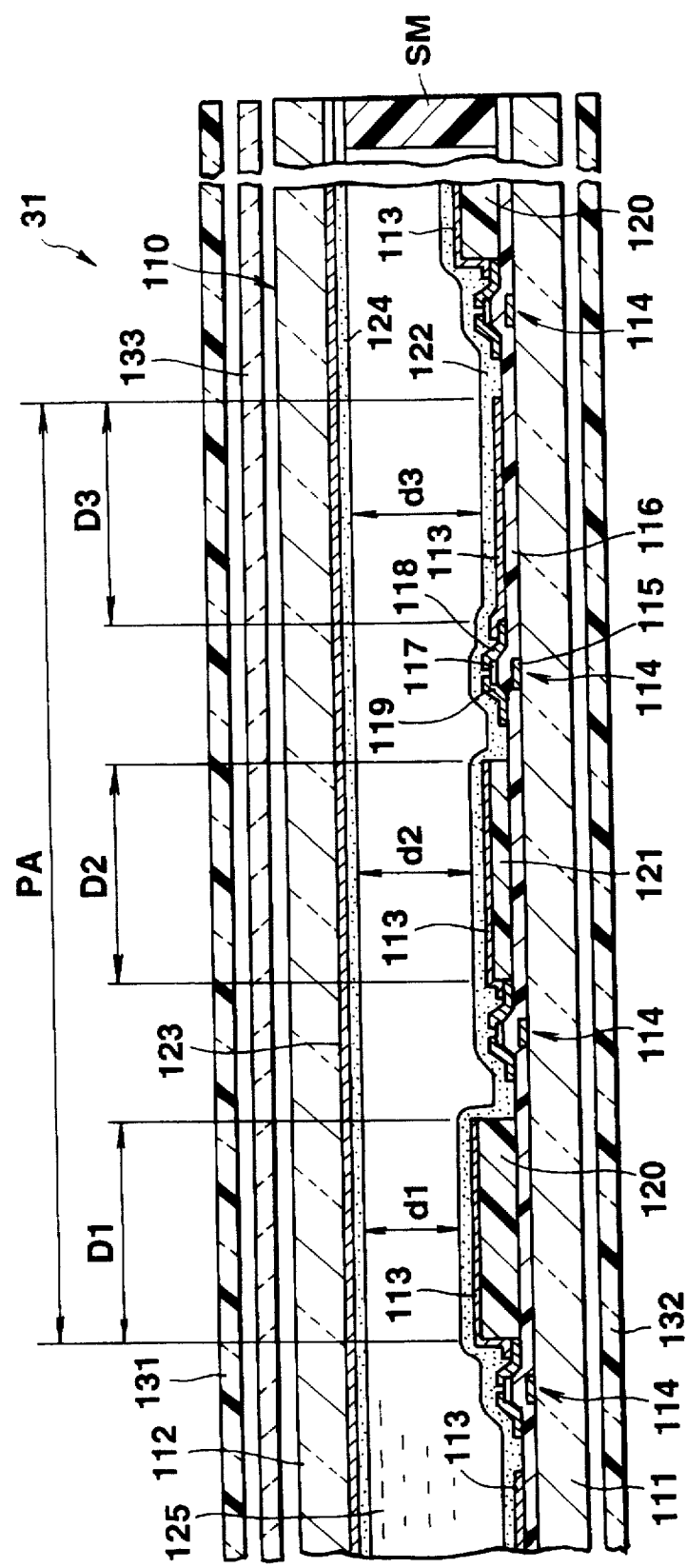
FIG. 20 is a cross-sectional view of an LC display device according to a fourth embodiment of this invention.

FIG. 20 is a cross-sectional view of an LC display device according to the fourth embodiment of this invention.

The LC display device of this embodiment comprises a dot matrix type LC cell 110, two polarization plates 131 and 132, and one retardation plate 133. The polarization plates 131 and 132 are arranged on the top and bottom side of the LC display device with the LC cell 110 in between. The retardation plate 133 is located between the polarization plate 131 on the top side and the LC cell 110.

The LC cell 110 comprises a pair of transparent substrates 111 and 112 of glass or the like, and a liquid crystal 125 sealed therebetween. A plurality of transparent pixel electrodes 113 arranged in rows and columns in a matrix form and a plurality of TFTs 114 associated with those pixel electrodes 113 are provided on the inner surface of the bottom side substrate (lower substrate in the diagram) 111 of the substrate pair 111 and 112 or the surface facing the LC layer. An alignment film 122 is provided on the pixel electrodes 113 and TFTs 114.

Each TFT 114 comprises: a gate electrode 115 formed on the substrate 111; a gate insulating film 116 covering the gate electrode 115; a semiconductor film 117 made of a-Si (amorphous silicon) or the like formed, facing the gate electrode 115, on the gate insulating film 116; and source and drain electrodes 118 and 119 formed on respective sides of the semiconductor film 117. The gate insulating film 116 is a transparent film of SiN (silicon nitride), $SiO_2$ or the like. The gate insulating film 116 is formed nearly all over the substrate 111.

Gate lines GL and data lines DL are provided on the back side substrate 111, as shown in FIG. 2. The gate line GL, excluding the terminal portion, is covered with the gate insulating film 116. The data line DL is formed on the gate insulating film 116. The data line DL is connected to the drain electrode 119 of the TFT 114.

Base films 120 and 121 are provided on the gate insulating film 116 in association with the portions where two of the adjoining three pixel electrodes 113 are formed. The base films 120 and 121 are transparent insulating films formed of SiN or the like, and have different thicknesses.

Of the adjoining three pixel electrodes 113, the first pixel electrode (left electrode in the diagram) 113 and the second pixel electrode (center electrode in the diagram) 113 are respectively formed on the base films 120 and 121. The third pixel electrode (right electrode in the diagram) 113 is formed on the gate insulating film 116. The pixel electrodes 113 are connected at their end portions to the source electrodes 118 of the associated TFTs 114. That is, the adjacent three pixel electrodes 113 are provided at different heights.

In this embodiment, the base film 120 is formed thicker than the base film 121. Therefore, the three pixel electrodes 113 become higher in the order of the third pixel electrode, the second one and the first one.

The alignment film 122 is formed entirely with a uniform thickness. Therefore, the surface of this alignment film 122 also has steps according to the surface height differences of the individual pixel electrodes 113.

A transparent opposing electrode 123 facing all the pixel electrodes 113 is provided on the top side substrate (upper substrate in the diagram) 112. An alignment film 124 is provided on the opposing electrode 123.

The substrates 111 and 112 are joined together at their peripheral portions via a frame-shaped seal member SM. The liquid crystal 125 is filled in the area surrounded by the substrates 111 and 112 and the seal member SM.

The liquid crystal 125 is a nematic liquid crystal having the positive dielectric anisotropy. The molecules of the liquid crystal 125 have the alignment direction restricted by the alignments 122 and 124, and are aligned with a twist angle of 90 degrees between both substrates 111 and 112. The alignment films 122 and 124 are horizontal alignment films formed of polyimide or the like, and their surfaces are subjected to an alignment process by rubbing.

In this embodiment, the pixel electrode 113 of the first dot D1, the pixel electrode 113 of the second dot D2, and the pixel electrode 113 of the third dot D3 are formed higher in the named order. Therefore, the thicknesses d1, d2 and d3 of the LC layer at the dots D1, D2 and D3 are d1<d2<d3. Thus, the values of $\Delta n \cdot d$ (the product of the refractive anisotropy $\Delta$ of the liquid crystal 125 and the thickness d of the LC layer) of three dots D1, D2 and D3 differ from one another.

The alignment direction of the LC molecules in the vicinity of the alignment films 122 and 124 (rubbing direction of the alignment films 122 and 124), the direction of the transmission axis of the pair of polarization plates 131 and 132 and the direction of the phase delay axis of the retardation plate 133 are set as follows.

In this embodiment, with the alignment direction of the LC molecules in the vicinity of the alignment film 122 taken as the direction of azimuth of 0 degree and as a reference direction, the alignment direction of the LC molecules in the vicinity of the alignment film 124, the direction of the transmission axis of the polarization plates 131 and 132 and the direction of the phase delay axis of the retardation plate 133 are set.

Figure 21A:
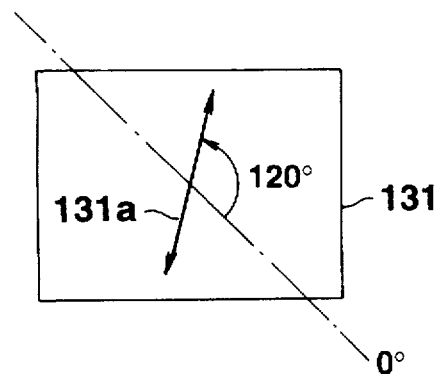
FIGS. 21A through 21D are diagrams showing the direction of the alignment of the LC display device shown in FIG. 20, the arrangement of the phase delay axis of a retardation plate, and the arrangement of the transmission axis of a polarization plate.
Figure 21B:
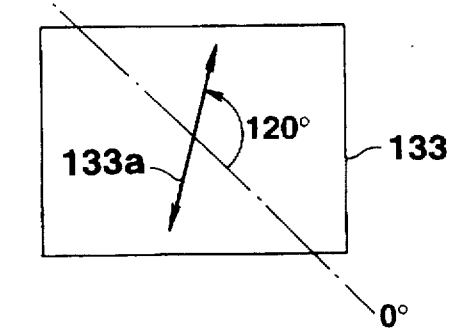
Figure 21C:
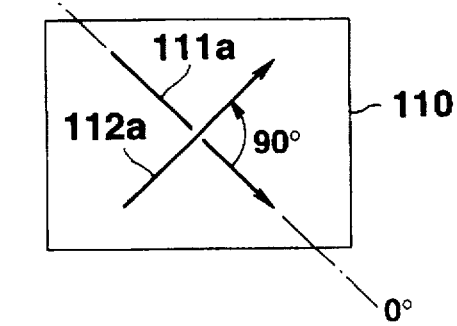

FIGS. 21A through 21D are plan view showing the alignment direction of the LC molecules, the direction of the transmission axis of the polarization plates 131 and 132 and the direction of the phase delay axis of the retardation plate 133. In FIG. 21C, reference numeral "111a" denotes the alignment direction of the LC molecules in the vicinity of the alignment film 122, and "112a" denotes the alignment direction of the LC molecules in the vicinity of the alignment film 124. As shown in FIG. 21C, the alignment direction 112a of the LC molecules in the vicinity of the alignment film 124 is aligned with a twist angle of nearly 90 degrees counterclockwise as viewed from the surface side with respect to the alignment direction 111a of the LC molecules in the vicinity of the alignment film 122.

Figure 21D:
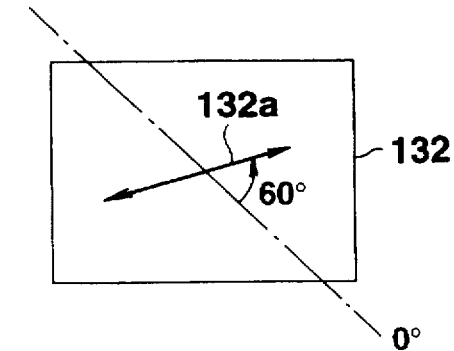

In FIG. 21D, reference numeral "132a" denotes the transmission axis of the polarization plate 132 located on the bottom side of the LC cell 110. The transmission axis 132a of the polarization plate 132 has an azimuth angle of 0 degrees, i.e., it is inclined by an angle of almost 60 degrees counterclockwise as viewed from the surface side with respect to the alignment direction 111a.

In FIG. 21A, reference numeral "131a" denotes the transmission axis of the polarization plate 131 located on the top side of the LC cell 110. In FIG. 21B, reference numeral "133a" denotes the phase delay axis of the retardation plate 133 located between the polarization plate 131 and the LC cell 110. As shown in FIG. 21B, the phase delay axis 133a is in the direction of almost 120 degrees counterclockwise as viewed from the surface side with respect to the direction of 0 degree. As shown in FIG. 21A, the transmission axis 131a is nearly in parallel to the phase delay axis 133a of the retardation plate 133 (the direction of almost 120 degrees counterclockwise as viewed from the surface side with respect to the azimuth angle of 0 degree).

The LC display device in this embodiment, unlike the one shown in FIG. 3, is of a transparent type. In this LC display device, the transmission axis 132a of the polarization plate 132 on the bottom side and the alignment direction 111a of the LC molecules are inclined. Accordingly, the linearly polarized light entering the LC cell 110 after passing the polarization plate 132 becomes elliptically polarized light whose light components of individual wavelengths have different polarized states due to the birifringence effect of the LC layer while passing the LC cell 110.

The elliptically polarized outgoing light from the LC cell 110 enters the retardation plate 133, and is further polarized by the birifringence effect of the retardation plate 133. The resultant polarized light then enters the polarization plate 131.

The light incident to the polarization plate 131 is elliptically polarized light whose light components of individual wavelengths have different polarized states and whose polarized state is changed by the birifringence effects of the LC layer of the LC cell 110 and the retardation plate 133. Of those elliptically polarized lights, the polarized component parallel to the transmission axis 131a of the polarization plate 131 leaves the LC display device, passing the polarization plate 131. As a result, the color corresponding to the wavelength of the outgoing light is displayed.

In other words, the above-described LC display device obtains colored lights by the birifringence effects of the LC layer of the LC cell 110 and the retardation plate 133. The amount of the light passing the polarization plate 131 and leaving the LC display device does not hardly differs from the amount of light component of the linearly polarized light coming through the polarization plate 132, which is in the wavelength range of the display color. This LC display device can therefore provide brighter color display than the LC display device which uses color filters having large light absorption.

At the temperature of the normal use, the birifringence effect of the retardation plate 133 is constant. The birifringence of the LC layer of the LC cell 110 however varies in accordance with the alignment state of the LC molecules. The color of the colored light can therefore be changed by controlling the voltage applied between the electrodes 113 and 123.

The color of the outgoing light from this LC display device is determined by the twist angle and refractive anisotropy Δn of the liquid crystal 125, the thickness d of the LC layer, the retardation Re of the retardation plate 133, the directions of the transmission axes 131a and 132a of the polarization plates 131 and 132, and the direction of the phase delay axis 133a of the retardation plate 133.

FIGS. 22 through 27 are CIE chromaticity diagrams of the LC display device. FIGS. 22 through 27 show the change in color of the outgoing light with respect to the applied voltage to one dot of the LC display device whose transmission axes 131a and 132a of the polarization plates 131 and 132 and phase delay axis 133a of the retardation plate 133 are set to the directions as shown in FIGS. 21A–21D, with the liquid crystal 125 having a twist angle of 90 degrees and having a refractive anisotropy Δn of 0.14 and the retardation plate 133 having a retardation Re of 900 nm (measured value with respect to the Na-D line), while changing the thickness d of the LC layer of that dot to d=5 μm, d=6 μm, d=7 μm, d=8 μm, d=9 μm, and d=10 μm.

As shown in FIGS. 22 through 27, when zero voltage is applied between the electrodes 113 and 123, the outgoing light first becomes white light which is hueless light. As the applied voltage becomes higher, the color of the outgoing light changes from white W to the color at the point x as indicated by the arrow, during which the color changes to have high light intensity and good color purity.

Figure 22:
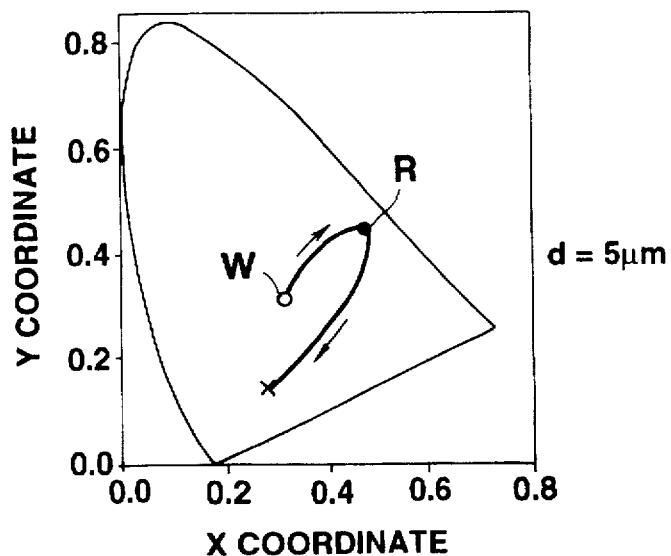
FIGS. 22 through 27 are CIE chromaticity diagrams showing display characteristics of individual pixels of the LC display device shown in FIGS. 20 and 21.

The color obtained during the change from white at the point W to the color at the point x (which has high light intensity and good color purity) is red R at d=5 μm as shown in FIG. 22. Therefore, the outgoing light from the dot with the LC layer thickness d of 5 μm has two colors, white and red.

Figure 23:
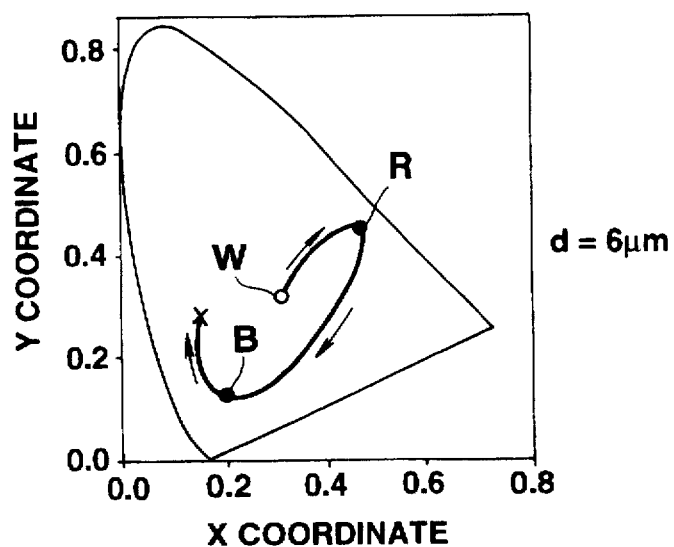
Figure 24:
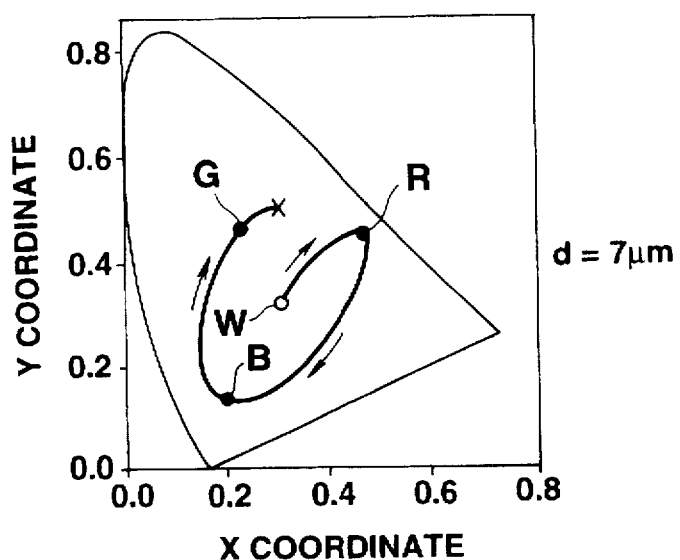
Figure 25:
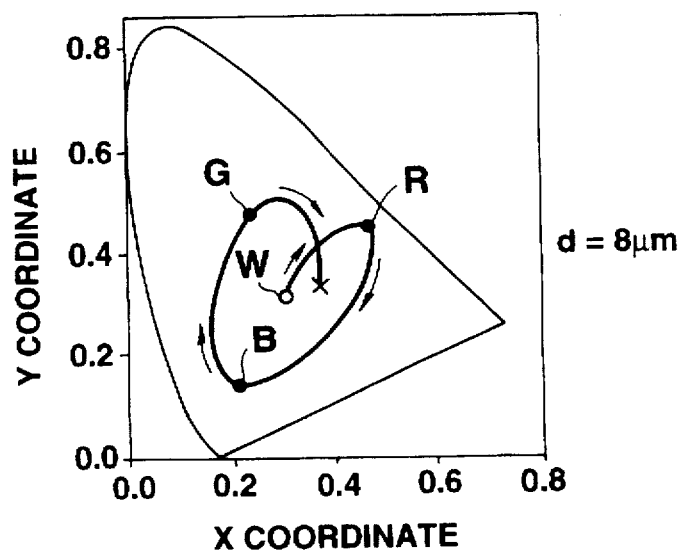
Figure 26:
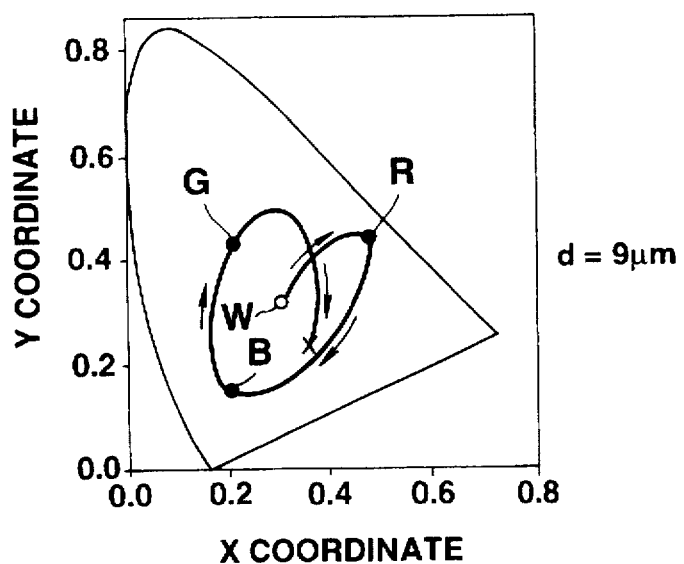
Figure 27:
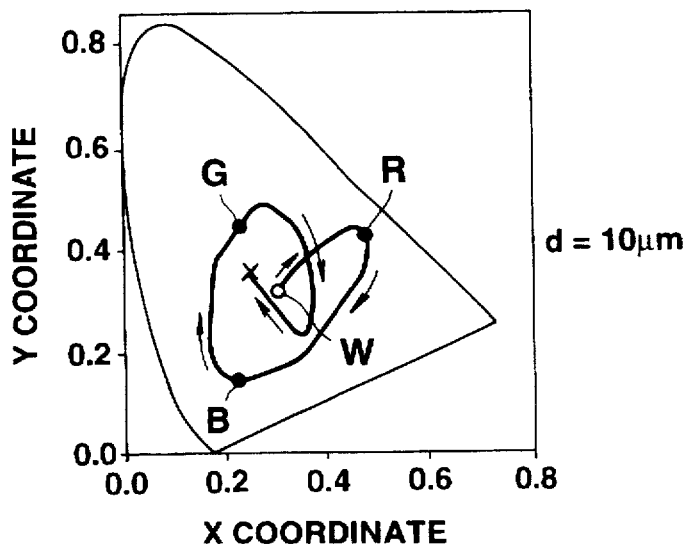

As shown in FIG. 23, with d=6 μm, the colors obtained while the color of the outgoing light changes from white at the point W to the color at the point x are red R and blue B. Therefore, there are three colors, white, red and blue, for the outgoing light from the dot with the LC layer thickness d of 6 μm.

As shown in FIGS. 24 through 27, with d=7 μm, d=8 μm, d=9 μm and d=10 μm, the colors obtained while the color of the outgoing light changes from white at the point W to the color at the point x are red R, blue B and green G. Therefore, there are four colors, white, red, green and blue, for the outgoing lights from the dots with the LC layer thicknesses d of 7 μm to 10 μm.

The relation between the LC layer thickness d of the dot and the presence/absence (Yes/No) of the color of the outgoing light is illustrated in Table 1.

TABLE 1

| Leaving Light | LC Layer Thickness (μm) | | | | | |
| --- | --- | --- | --- | --- | --- | --- |
| | 5 | 6 | 7 | 8 | 9 | 10 |
| white | yes | yes | yes | yes | yes | yes |
| red | yes | yes | yes | yes | yes | yes |
| green | no | no | yes | yes | yes | yes |
| blue | no | yes | yes | yes | yes | yes |

Even with the same color, the brightness (light intensity) of light differs depending on the LC layer thickness d. For example, the brightness (Y value) of white outgoing light is 4.4 at d=5 μm, 8.8 at d=6 μm, 20.0 at d=7 μm, 18.8 at d=8 μm, 10.4 at d=9 μm, and 10.0 at d=10 μm.

This LC display device can display the mixed color of the display colors three adjoining dots D1, D2 and D3 by the combination of those display colors. It is therefore possible to display a color image with rich color. Further, the LC layer thicknesses d1, d2 and d3 of the three dots D1, D2 and D3 constituting each pixel PA differ from one another. Thus, the values of Δn·d (the product of the refractive anisotropy Δn of the liquid crystal 125 and the LC layer thickness d) of three dots D1, D2 and D3 differ from one another. Accordingly, the birifringence effects of the LC layer at the dots D1, D2 and D3 differ from one another. This results in the differences in intensity of outgoing lights from the individual dots D1, D2 and D3. The brightness of the display of each pixel PA can be changed as desired to ensure a color gradation image by combining those lights with different intensities.

Table 2 shows the combinations of the display colors of three adjoining dots D1, D2 and D3 and the display colors of the associated pixel PA obtainable by the LC display device whose transmission axes 131a and 132a of the polarization plates 131 and 132 and phase delay axis 133a of the retardation plate 133 are set to the directions as shown in FIGS. 21A–21D, with the liquid crystal 125 having a twist angle of 90 degrees and having a refractive anisotropy Δn of 0.14 and the retardation plate 133 having a retardation Re of 900 nm.

In this example, the LC layer thicknesses d1, d2 and d3 of the respective dots D1, D2 and D3 are set to d1=5 μm, d2=7

μm, and d3=9 μm. There are two colors, white and red, for the outgoing light from the dot D1 with the LC layer thickness d1 of 5 μm, and there are four colors, white, red, green and blue, for the outgoing light from the dot D3 with the LC layer thickness d3 of 9 μm.

TABLE 2

| Display Color of Unit Area | Light Leaving Pixel Part | | |
|---|---|---|---|
| | Pixel Part D1 (d1 = 5 μm) | Pixel Part D2 (d2 = 7 μm) | Pixel Part D3 (d3 = 9 μm) |
| white 1 | white | white | white |
| white 2 | red | green | blue |
| white 3 | red | blue | green |
| red 1 | red | red | red |
| red 2 | white | red | red |
| red 3 | red | red | white |
| red 4 | red | white | red |
| red 5 | white | red | white |
| red 6 | white | white | red |
| red 7 | red | white | white |
| green 1 | white | green | green |
| green 2 | white | white | green |
| green 3 | white | green | white |
| blue 1 | white | blue | blue |
| blue 2 | white | white | blue |
| blue 3 | white | blue | white |
| yellow 1 | red | green | green |
| yellow 2 | red | green | white |
| yellow 3 | red | white | green |
| yellow 4 | red | red | green |
| yellow 5 | red | green | red |
| yellow 6 | white | red | green |
| yellow 7 | white | green | red |
| magenta 1 | red | blue | blue |
| magenta 2 | red | red | blue |
| magenta 3 | red | blue | red |
| magenta 4 | red | blue | white |
| magenta 5 | red | white | blue |
| magenta 6 | white | red | blue |
| magenta 7 | white | blue | red |
| cyan 1 | white | green | blue |
| cyan 2 | white | blue | green |

The individual display colors in Table 2 will now be described. For example, all of "white 1" to "white 3" are almost white (hueless). But, "white 1" having all three dots D1, D2 and D3 shown as white differs in the whiteness from "white 2" and "white 3" which have the dot D1 in red and one of the second and third dots D2 and D3 in green and the other dot in blue and are expressed by the color mixture of those three colors. Since there is a difference in brightness between the dots D1, D2 and D3, "white 1" to "white 3" have different brightness.

While "red 1" to "red 7" are all red, "red 1" having all three dots D1, D2 and D3 in red, "red 2" to "red 4" which have one of the dots D1–D3 in white and the other two in red, and "red 5" to "red 7" which have two of the dots D1–D3 in white and the remaining one in red, differ from one another in redness. Since outgoing lights from the dots D1, D2 and D3 have different intensities, "red 1" to "red 7" have different brightness.

Further, the first dot D1 is either in white or in red. Accordingly, "green 1" to "green 3" are expressed by setting the first dot D1 in white and setting the second and third dots D2 and D3 both in green, or setting one of the second and third dots D2 and D3 in green and setting the other one and the dot D1 in white. The densities and brightness of "green 1" to "green 3" likewise vary depending on the combination of the outgoing lights from the dots D2 and D3.

"Blue 1" to "blue 3" are expressed by setting the first dot D1 in white and setting the second and third dots D2 and D3 both in blue, or setting one of the second and third dots D2 and D3 in blue and setting the other one and the dot D1 in white. The densities and brightness of "blue 1" to "blue 3" also vary depending on the combination of the outgoing lights from the dots D2 and D3.

"Yellow 1" to "yellow 7" are expressed by setting the first dot D1 in red, setting one of the second and third dots D2 and D3 in green and setting the other in green or white, or setting the dot D1 in red and setting one of the second and third dots D2 and D3 in red with the other one set in green, or setting the dot D1 in white and setting one of the second and third dots D2 and D3 in red with the other one set in green. Likewise, "yellow 1" to "yellow 7" have different densities and different brightness.

"Magenta 1" to "magenta 7" are expressed by setting the first dot D1 in red, setting one of the second and third dots D2 and D3 in blue and setting the other in blue or white, or setting the dot D1 in red and setting one of the second and third dots D2 and D3 in blue with the other one set in red or white, or setting the dot D1 in white and setting one of the second and third dots D2 and D3 in red with the other one set in blue. Likewise, "magenta 1" to "magenta 7" have different densities and different brightness.

"Cyan 1" and "cyan 2" are expressed by setting the first dot D1 in white, setting one of the second and third dots D2 and D3 in green and setting the other in blue. Likewise, the densities and brightness of "cyan 1" differ from those of "cyan 2."

As apparent from the above, the pixel PA consisting of three dots can display more colors than a single dot can display. It is therefore possible to display a color image with rich color. It is also possible to arbitrarily select the brightness of each display color to provide a color gradation image.

In this LC display device, the linearly polarized light passing the polarization plate 132 on the back side is influenced by the birifringence effects of both the LC layer of the LC cell 110 and the retardation plate 133. This LC display device therefore has a greater influence of the birifringence effect with respect to light of each wavelength as compared with the type which uses only the birifringence effect of the LC layer. This increases the difference in the polarization state between the lights of individual wavelengths. Therefore, the colored outgoing light passing the surface-side polarization plate 132 has a clearer color.

The display colors of the pixels PA are not limited to those given in Table 2. The display color of each pixel PA can be arbitrarily selected by selecting the twist angle and refractive anisotropy Δn of the liquid crystal 125, the retardation Re of the retardation plate 133, the directions of the transmission axes 131a and 132a of the polarization plates 131 and 132, and the LC layer thicknesses d1, d2 and d3 of the adjoining three dots D1, D2 and D3.

When the LC display device of the fourth embodiment is used as the LC display device 31 in FIG. 2, it cannot be driven by the driving circuit shown in FIG. 1 because the optical characteristics of the three dots D1–D3 constituting each pixel PA differ from one another.

Accordingly, voltage data suitable for driving the LC display device shown in FIG. 20 should be stored in the conversion table 19.

For instance, with "red 1" shown in Table 2, voltage data for selecting the voltages to display red on the first to third dots are set in an area having an address defined by the image data corresponding to "red 1" in the conversion table 19. It should be noted that individual voltage data take different values. For instance, voltage data "011" indicating V3 is set as the voltage data for the first dot, voltage data "100" indicating V4 is set as the voltage data for the second dot, and voltage data "101" indicating V5 is set as the voltage data for the third dot.

Fifth Embodiment

Although the fourth embodiment has been described as having each pixel consisting of three dots, the number of dots constituting each pixel can take an arbitrary value. The following will describe the fifth embodiment in which one pixel consists of two dots.

Figure 28:
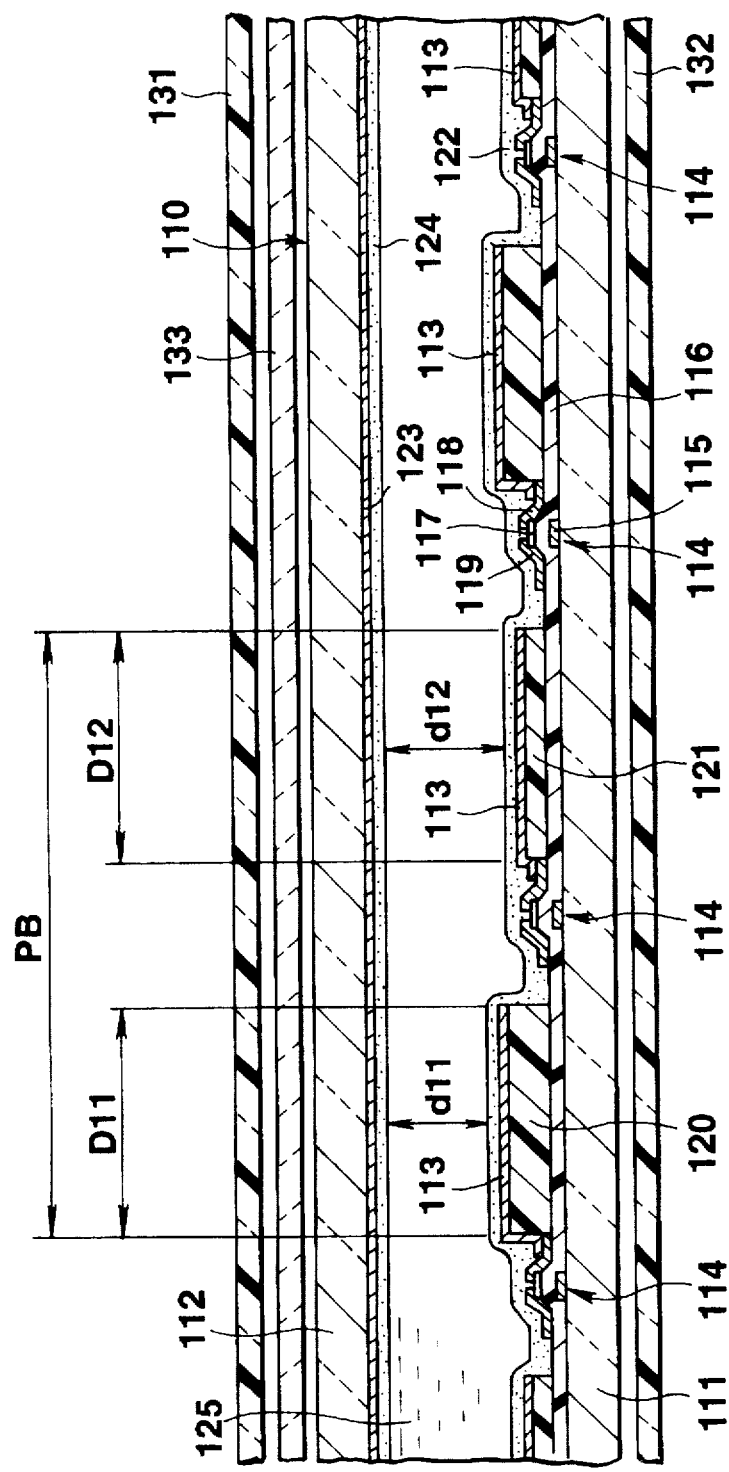
FIG. 28 is a cross-sectional view of an LC display device according to a fifth embodiment of this invention.

FIG. 28 is a cross-sectional view of a part of an LC display device according to the fifth embodiment. The LC display device of this embodiment comprises an active matrix type LC cell 110, two polarization plates 131 and 132, and one retardation plate 133. The polarization plates 131 and 132 are arranged on the top and bottom side of the LC display device with the LC cell 110 in between. The retardation plate 133 is located between the polarization plate 131 on the top side and the LC cell 110.

The LC cell 110 is designed in such a manner that one of adjoining two pixel electrodes 113 as one unit differs in height from the other electrode 113. The pixel electrodes 113 are formed on base films (transparent insulating films of SiN or the like) 120 and 121 with different thicknesses provided on a gate insulating film 116. The LC layer thicknesses, d11 and d12, of dots D11 and D12 of each pixel PB therefore differ from each other. The values of Δn·d of the dots D11 and D12 therefore differ from each other.

This LC display device, like the one of the fourth embodiment, is designed so that the alignment directions (rubbing directions) 111a and 112a of the LC molecules, the transmission axes 131a and 132a of the polarization plates 131 and 132, and the phase delay axis of the retardation plate 133 are set as shown in FIGS. 21A through 21D.

The linearly polarized light having passed the polarization plate 132 and having entered the LC cell 110 changes its polarization state due to the birifringence effects of the LC layer and the retardation plate 133. As a result, the color corresponding to the wavelength distribution of the light having passed the polarization plate 131 is displayed.

This LC display device also obtains colored lights by the birifringence effects of the LC layer of the LC cell 110 and the retardation plate 133 and provides bright color display. Further, the display color can be changed by controlling the voltage applied between the electrodes 113 and 123. By the combination of the display colors of the adjoining two dots D11 and D12, the mixed color of those two colors can be displayed. Therefore, the number of the display colors of each pixel PB is greater than the number of colors each dot D11 or D12 can display. This can ensure a color image with rich color.

For this LC display device too, the values of Δn·d of the dots D11 and D12 in each pixel PB differ from each other. Accordingly, the birifringence effects of the LC layer at the dots D11 and D12 differ from each other. This results in the difference in intensity of outgoing lights from the individual dots D11 and D2. The brightness of the display of each pixel PB can be changed as desired to ensure color gradation display by arbitrarily changing display brightness of each dots.

Table 3 shows the combinations of the display colors of the dots D11 and D2 and the display colors of the associated pixel PB. Those display characteristics are obtained by the LC display device whose transmission axes 131a and 132a of the polarization plates 131 and 132 and phase delay axis 133a of the retardation plate 133 are set to the directions as shown in FIGS. 21A to 21D, with the liquid crystal 125 having a twist angle of 90 degrees and having a refractive anisotropy Δn of 0.14 and the retardation plate 133 having a retardation Re of 900 nm. In this example, the LC layer thicknesses d11 and d12 of the respective dots D11 and D12 are set to d1=7 μm and d12 =9 μm. There are four colors, white, red, green and blue, for the display colors of the dots D1 and D12 as shown in Table 1 given above.

TABLE 3

| Display Color of Unit Area | Light Leaving Pixel Part | |
|---|---|---|
| | Pixel Part D11 (d11 = 7 μm) | Pixel Part D12 (d12 = 9 μm) |
| white | white | white |
| red 1 | red | red |
| red 2 | red | white |
| red 3 | white | red |
| green 1 | green | green |
| green 2 | green | white |
| green 3 | white | green |
| blue 1 | blue | blue |
| blue 2 | blue | white |
| blue 3 | white | blue |
| yellow 1 | red | green |
| yellow 2 | green | red |
| magenta 1 | red | blue |
| magenta 2 | blue | red |
| cyan 1 | green | blue |
| cyan 2 | blue | green |

The display colors of each pixel in Table 3 will now be described. For example, "red 1" is expressed by displaying two dots D11 and D12 in red. "Red 2" and "red 3" are expressed by setting one dot in red and the other dot in white. "Red 1," "red 2" and "red 3" have different color densities and different brightness.

Likewise, "green 1" to "green 3," "blue 1" to "blue 3," "yellow 1," "yellow 2," "magenta 1," "magenta 2," "cyan 1" and "cyan 2" have different densities of display colors and different brightness.

As apparent from the above, the number of display colors of the pixel PB is greater than the number of display colors of each dot. It is therefore possible to display a color image with rich color. It is also possible to arbitrarily select the brightness of each display color to provide a color gradation image.

In this LC display device of the fifth embodiment, the linearly polarized light passing the polarization plate 132 changes its polarization state due to the birifringence effects of both the LC layer and the retardation plate 133. Accordingly, this LC display device has a greater influence of the birifringence effect with respect to light of each wavelength as compared with the type which uses only the birifringence effect of the LC layer. This increases the difference in the polarization state between the lights of individual wavelengths, so that the colored outgoing light passing the polarization plate 132 has a clearer color.

The display colors of the pixels PB of the LC display device of this embodiment are not limited to those given in Table 3. The display color of each pixel PB can be arbitrarily selected by selecting the twist angle and refractive anisotropy Δn of the liquid crystal 125, the retardation Re of the retardation plate 133, the directions of the transmission axes 131a and 132a of the polarization plates 131 and 132, and the LC layer thicknesses d11 and d12 of the adjoining two dots D11 and D12.

Although the retardation plate 133 is located between the polarization plate 131 and the LC cell 110 in the LC display devices of the fourth and fifth embodiments, the retardation plate 133 may be located between the polarization plate 132 and the LC cell 110 instead.

In this case, the phase delay axis 133a of the retardation plate 133 should be inclined by a predetermined angle with respect to the transmission axis 132a of the polarization plate 132, and the alignment directions 111a and 112a of the LC molecules and the direction of the transmission axis 131a of the polarization plate 131 should be set arbitrarily. In this case, the linearly polarized light which has entered the LC cell 110 after passing the polarization plate 132 becomes elliptically polarized light whose light components of individual wavelengths have different polarized states due to the birifringence effect of the retardation plate 133, and this polarized light is further polarized by the birifringence effect of the LC layer of the LC cell 110. Only the light component in the direction of the transmission axis of the polarization plate 131 passes the polarization plate 131 and leaves the LC display device. This provides the colored light corresponding to the wavelength distribution of this outgoing light.

Sixth Embodiment

Although the LC display devices of the fourth and fifth embodiments are of a transparent type, the present invention may also be applied to a reflection type LC display device.

Figure 29:
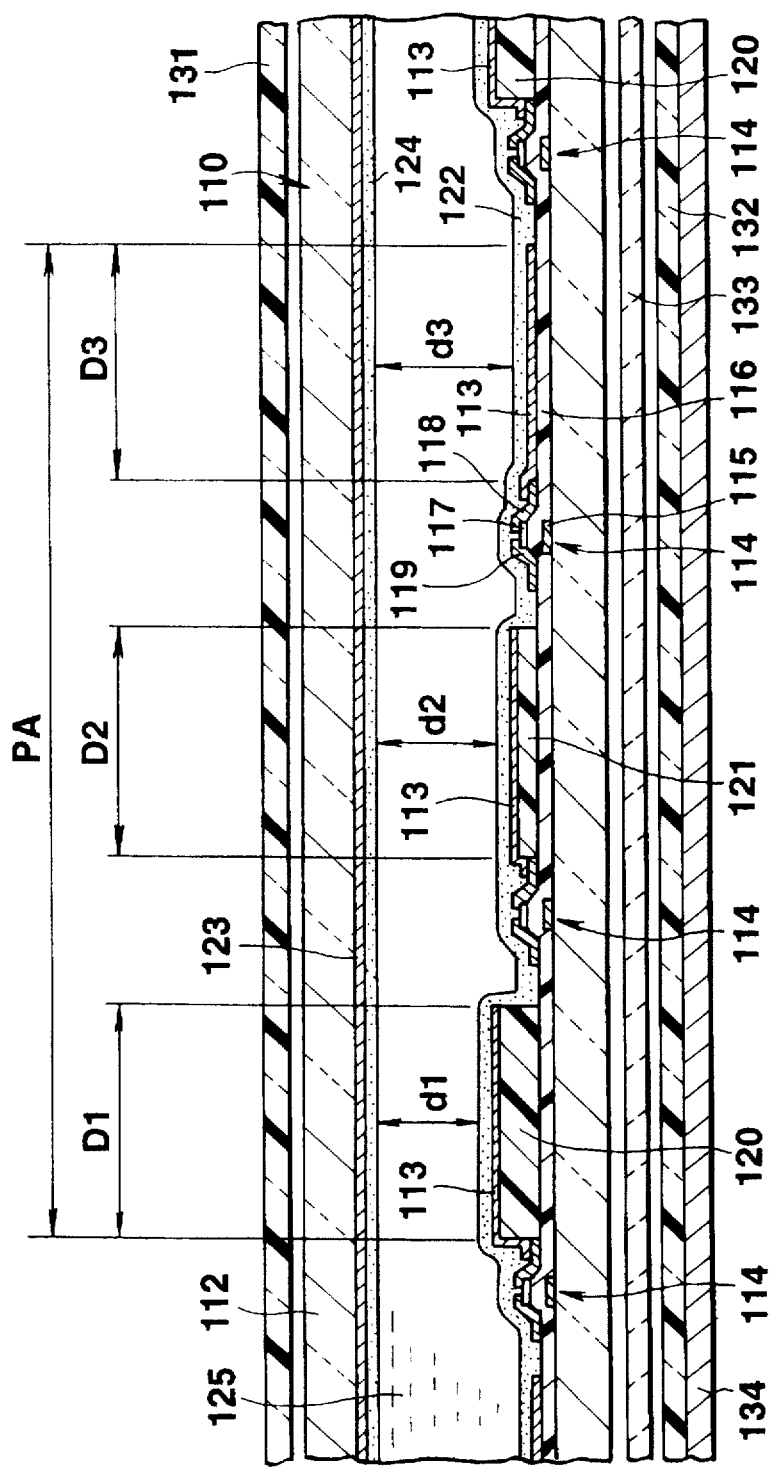
FIG. 29 is a cross-sectional view of an LC display device according to a sixth embodiment of this invention.

FIG. 29 is a cross-sectional view showing a part of a reflection type LC display device according to the sixth embodiment.

This LC display device corresponds to the LC display device shown in FIG. 20, which is modified to have the retardation plate 133 located between the polarization plate 132 and the LC cell 110 with a reflector 134 additionally provided at the back of the back-side polarization plate 132. In this LC display device, the transmission axis of the polarization plate 131 is inclined by a predetermined angle with respect to the alignment direction of the LC molecules in the vicinity of the alignment film 122. The LC molecules can have an arbitrary alignment direction, and the phase delay axis of the retardation plate and the transmission axis of the polarization plate 132 can have arbitrary directions.

The LC cell 110 is an active matrix type twisted with a twist angle of nearly 90 degrees. The LC layer thicknesses d1, d2 and d3 of the adjoining three dots D1, D2 and D3 constituting each pixel PA differ from one another. This LC cell 110 has the same structure as the LC cell 110 shown in FIG. 20.

This LC display device is a reflection type in which outside light (natural light or room illumination light) enters from the surface side and is reflected at the back-side reflector 134 to display an image. In this LC display device, the linearly polarized light which has entered the LC cell 110 after passing the polarization plate 131 becomes elliptically polarized light whose light components of individual wavelengths have different polarized states due to the birifringence effect of the LC layer. This elliptically polarized light is further polarized by the birifringence effect of the retardation plate 133 and enters the polarization plate 132. Of the light having entered the polarization plate 132, the polarized light component parallel to the transmission axis 132a passes the polarization plate 132 and leaves the LC display device. This outgoing light is reflected at the reflector 134, sequentially passes the polarization plate 132, the retardation plate 133, the LC cell 110, and the surface-side polarization plate 131, and outgoes toward the surface side.

The LC display device of this embodiment also obtains colored light by the birifringence effects of the LC cell 110 and the retardation plate 133, and thus ensures bright color display. Further, the color of the colored light can be changed by controlling the voltage applied between the electrodes 113 and 123.

Even in the LC display device, the LC layer thicknesses d1, d2 and d3 of the individual dots D1, D2 and D3 constituting each pixel PA of the LC cell 110 differ from one another. It is therefore possible to accomplish gradation color display with rich color.

This LC display device can cause the surface-side polarization plate 131 to absorb the light of an unnecessary wavelength (light of a wavelength lying off the wavelength range of the color to be displayed) included in the light reflected at the reflector 134. Therefore, a clear display color can be obtained.

Although the retardation plate 133 is located between the polarization plate 132 and the LC cell 110 in this embodiment, the retardation plate 133 may be located between the polarization plate 131 and the LC cell 110.

Seventh Embodiment

In the sixth embodiment, the polarization plates 131 and 132 are respectively provided on the surface side and back side of the LC cell 110. In a reflection type LC display device, however, the polarization plate may be provided only on the surface side of the LC cell 110. A reflection type ECB LC display device according to the seventh embodiment, which uses only a single polarization plate, will be described below.

Figure 30:
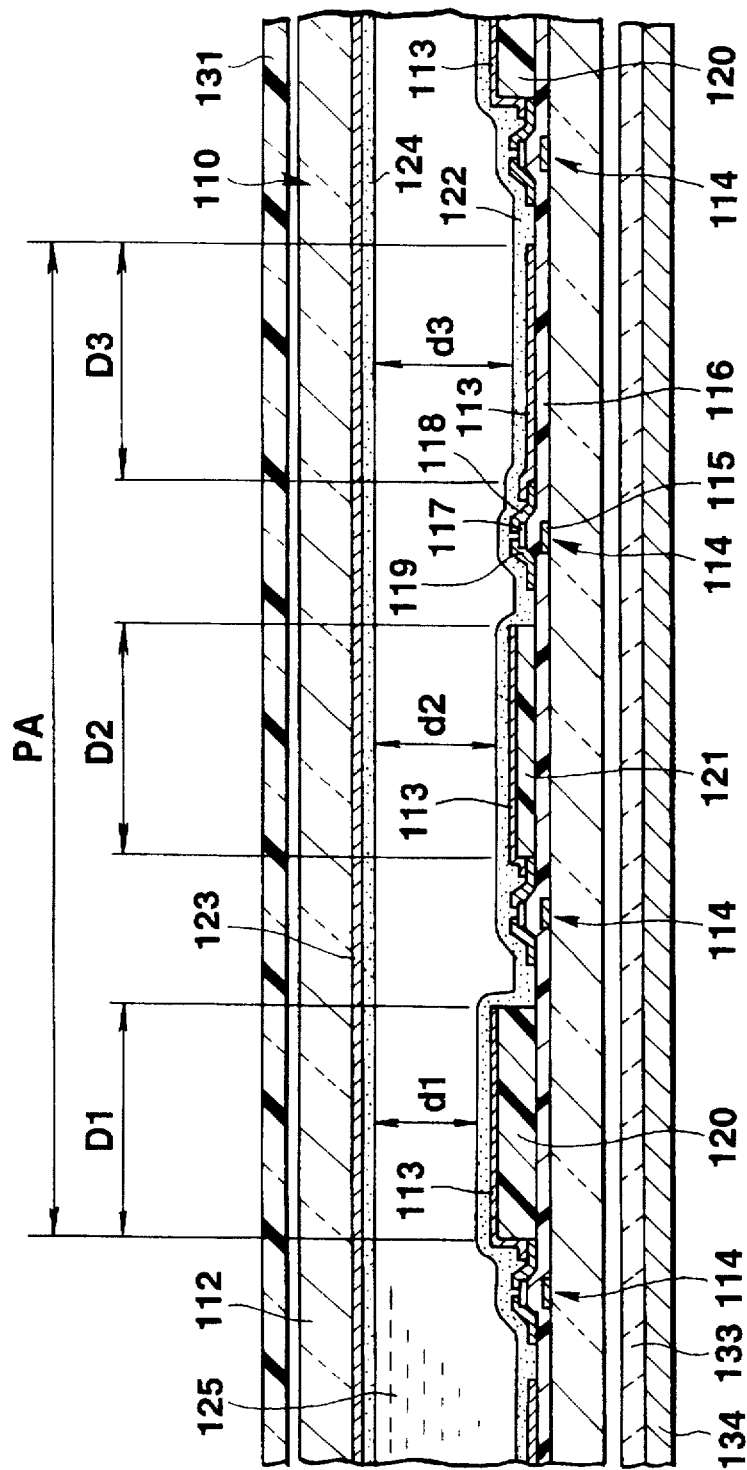
FIG. 30 is a cross-sectional view of an LC display device according to a seventh embodiment of this invention.

FIG. 30 is a cross-sectional view showing a part of the reflection type LC display device according to the seventh embodiment. The LC display device of this embodiment comprises the polarization plate 131 located on the surface side of the LC cell 110, the reflector 134 located on the back side of the LC cell 110, and the retardation plate 133 located between the LC cell 110 and the reflector 134.

This LC display device corresponds to the LC display device of the sixth embodiment shown in FIG. 29 from which the back-side polarization plate 132 is removed. The other structure is the same as that of the LC display device of the sixth embodiment.

The LC display device of this embodiment also reflects the outside light entering from the surface side at the reflector 134 to display an image. The linearly polarized light which has entered the LC cell 110 after passing the polarization plate 131 changes the polarization state due to the birifringence effects of the retardation plate 133 and the LC cell 110. The outgoing light from the LC cell 110 is reflected at the reflector 134. The reflected light passes the LC cell 110 and the retardation plate 133 again to be influenced by the birifringence effects and then enters the polarization plate 131. Of the incident light, the component parallel to the transmission axis 131a of the polarization plate 131 passes the polarization plate 131 and leaves the LC display device.

Even in this LC display device, the polarization state of the incident light is changed by the birifringence effects of both the LC layer of the LC cell 110 and the retardation plate 133. Accordingly, this LC display device provides clearer display colors than type which uses only the birifringence effect of the LC layer. The thicknesses d1, d2 and d3 of the three dots D1, D2 and D3 constituting each pixel PA of the LC cell 110 differ from one another. It is therefore possible to make the number of display colors of each pixel PA greater than the number of display colors of one dot. This can provide a color image with rich color. It is also possible to arbitrarily select the brightness of each display color to provide color gradation display.

As one polarization plate 131 is used, there is less absorption of light by the polarization plate, thus ensuring brighter display than the reflection type LC display device which uses two polarization plates.

Although the retardation plate 133 is located between the LC cell 110 and the reflector 134, the retardation plate 133 may be located between the LC cell 110 and the polarization plate 131.

Eighth Embodiment

Although the reflector 134 is located at the back of the LC cell 110 in the seventh embodiment, if the LC cell 110 is constituted of a reflection type cell, the reflector 134 becomes unnecessary. The following will describe an LC display device according to the eighth embodiment whose LC cell 110 is of a reflection type.

Figure 31:
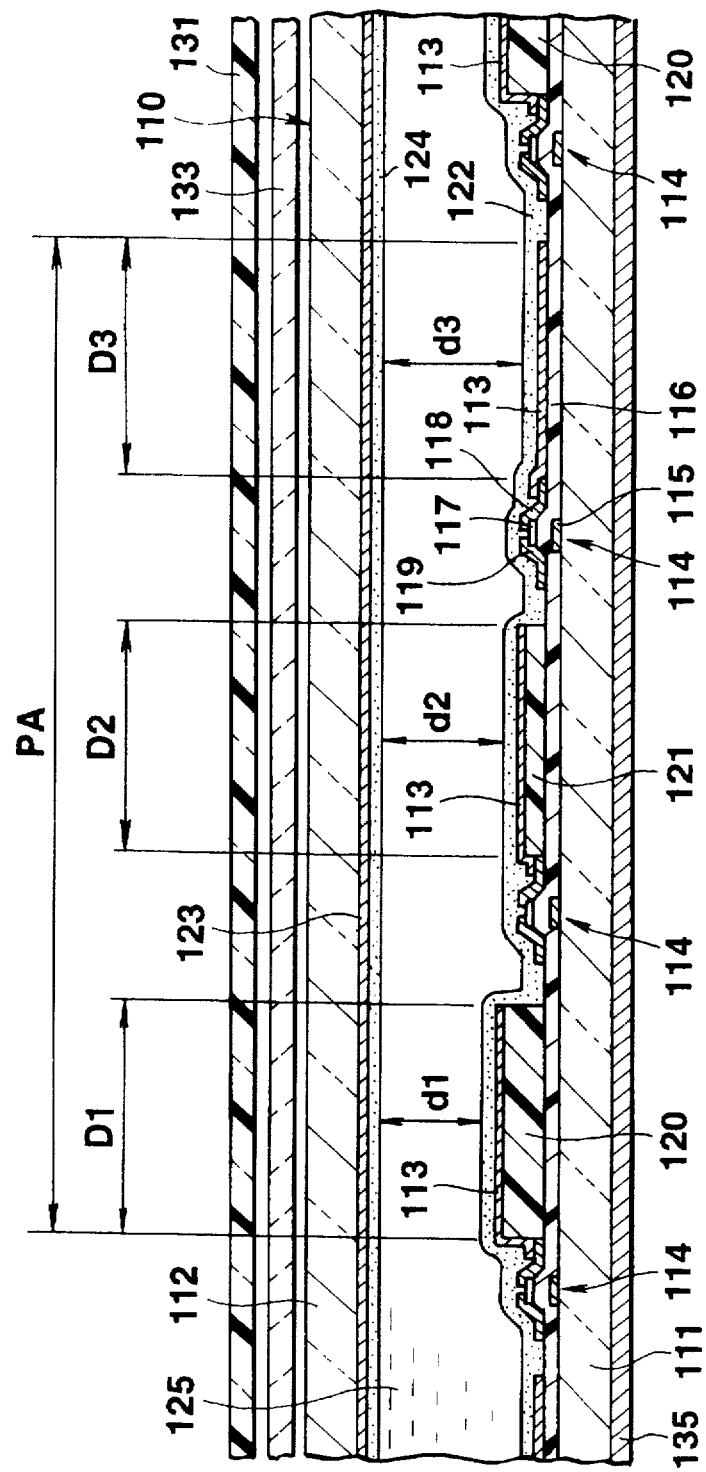
FIG. 31 is a cross-sectional view of an LC display device according to an eighth embodiment of this invention.

FIG. 31 is a cross-sectional view showing a part of the reflection type LC display device according to the eighth embodiment. This LC display device has a reflection type LC cell 110, and has the polarization plate 131 located on the surface side of the LC cell 110 and the retardation plate 133 located between the polarization plate 131 and the LC cell 110.

The reflection type cell 110 is formed by adhering or vapor-depositing a reflection film like an aluminum film on the outer surface of the back-side substrate 111 of the LC cell 110 shown in FIG. 20. The other structure is the same as that of the first embodiment.

The LC display device of this embodiment also reflects the outside light entering from the surface side at the reflector 134 to display an image. In this LC display device, the linearly polarized light which has entered the LC cell 110 after passing the polarization plate 131 changes the polarization state due to the birifringence effects of the retardation plate 133 and the LC layer of the LC cell 110, and is reflected at a reflection film 135. The reflected light passes the LC layer and the retardation plate 133 to be influenced by the birifringence effects and then enters the polarization plate 131. Of the incident light, the component in the direction of the transmission axis 131a passes the polarization plate 131 and leaves the LC display device.

Even in this LC display device, the polarization state of the incident light is changed by the birifringence effects of both the LC layer of the LC cell 110 and the retardation plate 133. Accordingly, this LC display device provides clearer display colors than type which uses only the birifringence effect of the LC layer. The thicknesses d1, d2 and d3 of the three dots D1, D2 and D3 constituting each pixel PA differ from one another. It is therefore possible to make the number of display colors of each pixel PA greater than the number of display colors of one dot. This can provide a color image with rich color. It is also possible to arbitrarily select the brightness of each display color, thus ensuring color gradation display.

As one polarization plate is used, there is less absorption of light by the polarization plate, thus ensuring brighter display than the reflection type LC display device which uses two polarization plates.

Although the reflection film 135 is provided on the outer surface of the substrate 111 to make the LC cell 110 as a reflection cell in this embodiment, the reflection film 135 may be provided on the inner surface of the substrate 111. In this case, a transparent insulating film covering the reflection film is provided and TFTs 114 and pixel electrodes are provided on this transparent insulating film. Further, all the pixel electrodes 113 may be formed of metal like aluminum so that the pixel electrodes 113 also serve as the reflection film.

If a reflection film is provided on the inner surface of the substrate 111 or the pixel electrodes 113 are designed to serve as a reflection film, the incident light is reflected without passing the back-side substrate 111. This can eliminates the loss of light which is otherwise absorbed by the substrate 111.

In the LC display devices of the fourth to eighth embodiments, the LC layer thicknesses d1, d2 and d3 or d11 and d12 are made different from one another by making the heights of the pixel electrodes 113 at the dots D1, D2 and D3 constituting each pixel PA or at the dots D11 and D12 constituting each pixel PB. But, the LC layer thicknesses d1, d2 and d3 or d11 and d12 may be made different from one another by making the heights of the opposing electrodes 123 different from one another dot by dot.

Further, the LC layer thicknesses may be altered by partially forming an insulating film of $SiO_2$, SiN or the like on the pixel electrodes 113 or the opposing electrode 123. The optical characteristics may be made different one another dot by dot by providing phase difference films with different characteristics on the individual dots.

The LC cells 31 and 110 are not limited to a type which has TFTs as switching elements, they may be an active matrix type which uses MIMs as switching elements. Those LC cells may have pixel electrodes and switching elements on the surface-side substrate and an opposing electrode on the back-side substrate.

The LC cell is not limited to an active matrix type, but may be a direct matrix type which has a plurality of scan electrodes provided in parallel on one substrate and a plurality of signal electrodes provided perpendicular to the scan electrodes on the other substrate. In this case, the surface heights of the scan electrodes or signal electrodes should differ from one another dot by dot, and the LC layer thicknesses at the individual dots of a unit area should differ from one another.

In the first to eighth embodiments, a nematic liquid crystal having the positive dielectric anisotropy is twisted. However, this invention may be adapted for various other types of display devices, such as a DAP (Deformation of Aligned Phase) type which uses a cell having LC molecules in a homeotropic alignment, a parallel aligned nematic (homogeneous) type which uses a cell having LC molecules aligned in a twistless homogeneous form, an HAN (Hybrid Aligned Nematic) type which uses a cell having LC molecules aligned perpendicular on the surface of one substrate and parallel on the surface of the other substrate with the alignment continuously changing between both substrates, and a LC alignment mode type which uses a cell having an LC layer whose LC molecules change between the splay alignment and bend alignment in accordance with the applied voltage.

What is claimed is:

1. A liquid crystal display apparatus comprising:
   a liquid crystal display device having a plurality of dots arranged in a matrix form, each dot being capable of displaying any one from among a plurality of different colors in accordance with applied voltages, dot by dot;
   reception means for receiving data defining a display color of each pixel including a plurality of dots;
   conversion means for converting said received data to data defining voltages, corresponding to said plurality of different colors respectively, to be applied to said plurality of dots constituting each pixel in order to display a display color of each pixel defined by said received data by a combined display of said dots constituting that pixel; and drive means for applying a voltage corresponding to data from said conversion means to said plurality of dots to display said display color of each pixel by a combined display of said plurality of dots.

2. The liquid crystal display apparatus according to claim 1, wherein said conversion means includes means for converting said received data to data defining the voltages for displaying said display color as a combined display of M dots or data for defining the voltage for displaying said display color as a combined display of N dots in accordance with said display color defined by said received data, thereby displaying a substantially same color with a different number of dots, where N and M are positive integers greater than one and not equal to each other.

3. The liquid crystal display apparatus according to claim 1, wherein said conversion means includes means for outputting data for making an arrangement of display colors of dots constituting pixels having a same display color different for each adjoining scan line of said liquid crystal display device.

4. The liquid crystal display apparatus according to claim 1, wherein said conversion means comprises:

means for converting said received data to data defining the voltage for displaying a color by a combined display of M dots when a plurality of adjoining pixels on a same scan line defined by said received data have a same display color; and means for converting said received data to data defining the voltage for displaying a color by a combined display of N dots when a plurality of adjoining pixels on a same scan line defined by said received data have different display colors, thereby displaying a substantially same color with a different number of dots, wherein N and M are positive integers greater than one and not equal to each other.

5. The liquid crystal display apparatus according to claim 1, wherein when a plurality of adjoining pixels on a same scan line defined by said received data have a same display color, said conversion means converts said received data to data for making display colors of dots constituting said adjoining pixels different from one another.

6. The liquid crystal display apparatus according to claim 1, wherein said conversion means comprises a table for storing data corresponding to applied voltages to individual dots for each display color.

7. The liquid crystal display apparatus according to claim 1, wherein said liquid crystal display device is of a birifringence control type.

8. The liquid crystal display apparatus according to claim 7, wherein said liquid crystal display device comprises:

a first substrate subjected to an aligning treatment in a first direction;

a second substrate arranged facing said first substrate and having a face opposing said first substrate, subjected to an aligning treatment in a second direction intersecting said first direction;

a liquid crystal sealed between said first and second substrates and having a twisted alignment in accordance with said aligning treatment;

a first polarization plate arranged outside said first substrate and having an optical axis intersecting said first direction at an angle other than 90 degrees; and a second polarization plate arranged outside said second substrate and having an optical axis intersecting said first direction.

9. The liquid crystal display apparatus according to claim 8, further comprising at least one retardation plate located between said first and second polarization plates.

10. The liquid crystal display apparatus according to claim 1, wherein said liquid crystal display device has a dot matrix type liquid crystal cell for obtaining colored light by a birifringence effect, and characteristics of display colors with respect applied voltages to a plurality of adjoining dots differ from one another.

11. The liquid crystal display apparatus according to claim 1, wherein said received data includes data defining a hue and gradation of each pixel.

12. The liquid crystal display apparatus according to claim 1, wherein said liquid crystal display device comprises:

a first substrate having pixel electrodes and active elements formed on one surface in a matrix form, said active elements being respectively connected to said pixel electrodes;

a second substrate arranged facing said first substrate and having an opposing electrode formed on a face opposing said first substrate, said opposing electrode facing said pixel electrodes; and a liquid crystal sealed between said first and second substrates.

13. A method of driving a liquid crystal display device for displaying colors in accordance with applied voltages dot by dot, said method comprising:

providing a liquid crystal display device having dots arranged in a matrix form, each dot being capable of displaying any one from among a plurality of different colors in accordance with applied voltages, dot by dot;

a conversion step of receiving image data defining a display color of each pixel and converting said image data to applied voltages, corresponding to said plurality of different colors respectively, to a plurality of dots constituting that pixel; and a drive step of applying said applied voltages produced by said conversion step to said plurality of dots to drive said liquid crystal display device, thereby displaying said display color by a combined display of a plurality of dots.

14. The method according to claim 13, wherein said conversion step include the steps of:

converting said image data to voltage data defining applied voltages to a plurality of dots constituting each pixel; and converting said voltage data to applied voltages to said individual dots.

15. The method according to claim 13, wherein said conversion step includes a step of converting said image data to applied voltages to M dots or applied voltages to N dots in accordance with said image data, thereby displaying a substantially same color with a different number of dots, where N and M are positive integers greater than one and not equal to each other.

16. The method according to claim 13, wherein said conversion step includes a step of outputting data for making an arrangement of display colors of dots constituting pixels having a same display color different for each adjoining scan line of said liquid crystal display device.

17. The method according to claim 13, wherein said conversion step includes: a step of converting said image data to data for displaying a color defined by a combined display of M dots when a plurality of adjoining pixels on a same scan line defined by said received data have a same display color; and a step of converting said image data to data for displaying a color defined by a combined display of N dots when a plurality of adjoining pixels on a same scan line defined by said image data have different display colors, thereby displaying a substantially same color with a different number of dots, where N and M are positive integer greater than one and not equal to each other.

18. The method according to claim 13, wherein when a plurality of adjoining pixels on a same scan line defined by said image data have a same display color, said conversion step converts said image data to data for making display colors of dots constituting said adjoining pixels different from one another.

19. The method according to claim 13, wherein said liquid crystal display device has a dot matrix type liquid crystal cell for obtaining colored light by a birifringence effect, and characteristics of display colors with respect applied voltages to a plurality of adjoining dots differ from one another.

20. The method according to claim 13, wherein said image data includes data defining a hue and gradation of each pixel.

21. The method according to claim 13, wherein said liquid crystal display device comprises:

a first substrate subjected to an aligning treatment in a first direction;

a second substrate arranged facing said first substrate and having a face opposing said first substrate, subjected to an aligning treatment in a second direction intersecting said first direction;

a liquid crystal sealed between said first and second substrates and having a twisted alignment in accordance with said aligning treatment;

a first polarization plate arranged outside said first substrate and having an optical axis intersecting said first direction at an angle other than 90 degrees;

a second polarization plate arranged outside said second substrate and having an optical axis intersecting said first direction; and at least one retardation plate located between said first and second polarization plates.

22. The method according to claim 13, wherein said liquid crystal display device comprises:

a first substrate having pixel electrodes and active elements formed on one surface in a matrix form, said active elements being respectively connected to said pixel electrodes;

a second substrate arranged facing said first substrate and having an opposing electrode formed on a face opposing said first substrate, said opposing electrode facing said pixel electrodes; and a liquid crystal sealed between said first and second substrates.

23. An apparatus for driving a liquid crystal display device with a matrix of dots for displaying colors and gradations according to applied voltages dot by dot, with each dot being capable of displaying any one from among a plurality of different colors, said apparatus comprising:

conversion means for converting image data defining a display color of each pixel to data defining applied voltages, corresponding to said plurality of different colors respectively, to a plurality of dots constituting each pixel in order to display said display color of that pixel defined by said image data defining said display color of said pixel by a combined display of said individual dots constituting said pixel; and drive means having a connecting portion to be connected to said liquid crystal display device, for applying a voltage corresponding to data from said conversion means to said plurality of dots.

* * * * *